(12) United States Patent
Kawa et al.

(10) Patent No.: US 10,381,100 B2
(45) Date of Patent: Aug. 13, 2019

(54) ENHANCING MEMORY YIELD AND PERFORMANCE THROUGH UTILIZING NANOWIRE SELF-HEATING

(71) Applicant: Synopsys, Inc., Mountain View, CA (US)

(72) Inventors: Jamil Kawa, Campbell, CA (US); Victor Moroz, Saratoga, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 15/634,906

(22) Filed: Jun. 27, 2017

(65) Prior Publication Data

US 2018/0005708 A1 Jan. 4, 2018

Related U.S. Application Data

(63) Continuation of application No. 15/634,845, filed on Jun. 27, 2017.
(Continued)

(51) Int. Cl.
*G11C 11/44* (2006.01)
*G11C 29/44* (2006.01)
(Continued)

(52) U.S. Cl.
CPC ...... *G11C 29/4401* (2013.01); *G06F 17/5072* (2013.01); *G06F 17/5081* (2013.01);
(Continued)

(58) Field of Classification Search
None
See application file for complete search history.

(56) References Cited

U.S. PATENT DOCUMENTS

2003/0026131 A1 2/2003 Matarrese et al.
2005/0145983 A1 7/2005 Bertin et al.
(Continued)

OTHER PUBLICATIONS

"Self-Heating Effects in Nanowire Transistors" by Arif Hossain, Aug. 2011.*
(Continued)

*Primary Examiner* — Evren Seven
(74) *Attorney, Agent, or Firm* — Haynes Beffel & Wolfeld LLP; Yiding Wu

(57) ABSTRACT

A method for improving an integrated circuit design which has transistors with nanowire channels comprises identifying a particular device having a particular transistor with a nanowire channel; and adding to the integrated circuit design circuitry which, when activated, repairs the particular transistor by self-heating. The method can comprise determining a memory cell that has a read current below a passing criteria, the memory cell having a transistor with a nanowire channel on a current path through which the read current flows; and applying a stress on the memory cell to repair the nanowire channel of the transistor in the memory cell on the current path. The determining step can include sensing read currents of memory cells in an array of memory cells; and determining one or more memory cells in the array of memory cells having read currents below the passing criteria, using the read currents sensed.

6 Claims, 16 Drawing Sheets

Related U.S. Application Data

(60) Provisional application No. 62/384,337, filed on Sep. 7, 2016, provisional application No. 62/357,892, filed on Jul. 1, 2016, provisional application No. 62/357,897, filed on Jul. 1, 2016.

(51) Int. Cl.
| | |
|---|---|
| *G06F 17/50* | (2006.01) |
| *G11C 11/417* | (2006.01) |
| *G11C 29/50* | (2006.01) |
| *H01L 21/225* | (2006.01) |
| *H01L 21/324* | (2006.01) |
| *H01L 21/66* | (2006.01) |
| *H01L 23/34* | (2006.01) |
| *H01L 27/02* | (2006.01) |
| *H01L 27/11* | (2006.01) |
| *H01L 29/06* | (2006.01) |
| *H01L 29/10* | (2006.01) |
| *H01L 29/786* | (2006.01) |
| *H03K 19/003* | (2006.01) |
| *G11C 11/419* | (2006.01) |
| *G11C 29/06* | (2006.01) |
| *H01L 21/326* | (2006.01) |

(52) U.S. Cl.
CPC .......... *G11C 11/417* (2013.01); *G11C 11/419* (2013.01); *G11C 29/06* (2013.01); *G11C 29/50* (2013.01); *H01L 21/225* (2013.01); *H01L 21/324* (2013.01); *H01L 21/326* (2013.01); *H01L 22/26* (2013.01); *H01L 23/345* (2013.01); *H01L 27/0203* (2013.01); *H01L 27/1104* (2013.01); *H01L 27/1116* (2013.01); *H01L 29/0669* (2013.01); *H01L 29/1033* (2013.01); *H01L 29/786* (2013.01); *H03K 19/00315* (2013.01); *G11C 2029/5006* (2013.01); *G11C 2213/17* (2013.01)

(56) References Cited

U.S. PATENT DOCUMENTS

| | | |
|---|---|---|
| 2009/0190413 A1 | 7/2009 | Hsu et al. |
| 2010/0230807 A1 | 9/2010 | Bronner et al. |
| 2013/0039139 A1 | 2/2013 | Raval et al. |
| 2015/0063009 A1 | 3/2015 | Leung et al. |

OTHER PUBLICATIONS

Chang-Hoon Jeon et al., "Joule Heating to Enhance the Performance of a Gate-All-Around Silicon Nanowire Transistor," IEEE Transactions on Electron Devices, vol. 63, No. 6, Jun. 2016, pp. 2288-2292.
PCT/US2017/040113—International Search Report dated Oct. 20, 2017, 13 pages.
Victor Moroz "Transistor and Logic Design for 5nm Technology Node," Synopsys, Semicon Taiwan Sep. 9, 2016, 24 pages.
U.S. Appl. No. 15/634,845—Office Action dated Nov. 28, 2018, 14 pages.
PCT/US2017/040113—International Preliminary Report on Patentability dated Feb. 11, 2019, 8 pages.

\* cited by examiner

Period = 1ns, Clock = 1 GHz

| Path | Start | End | Slack |
|---|---|---|---|
| 1 | DF11:CLK | O11 | -33 ps |
| 2 | A2 | O23 | -24 ps |
| 3 | DF23:CLK | O11 | -12 ps |
| 4 | A1 | O14 | -6 ps |
| 5 | B3 | O6 | 2 ps |
| 6 | B3:CLK | O6 | 9 ps |
| ... | ... | ... | ... |
| n | DF12:CLK | O7 | 29 ps |

Negative Slack on Critical Path → -33 ps
Negative slacks: -24 ps, -12 ps, -6 ps
Positive slacks: 2 ps, 9 ps, ..., 29 ps

FIG. 5A: Circuit Path Timing

Period = 1ns, Clock = 1 GHz

| Start | int1 | | int2 | Cumulative Delay | int3 | Cumulative Delay | total delay | slack |
|---|---|---|---|---|---|---|---|---|
| DF11:CLK | DF11:q | 45ps | OR2D2:Z | 189 ps | XOR:Z | 1033ps | 1033ps | -33 ps |

FIG. 5B: Critical Path Breakdown

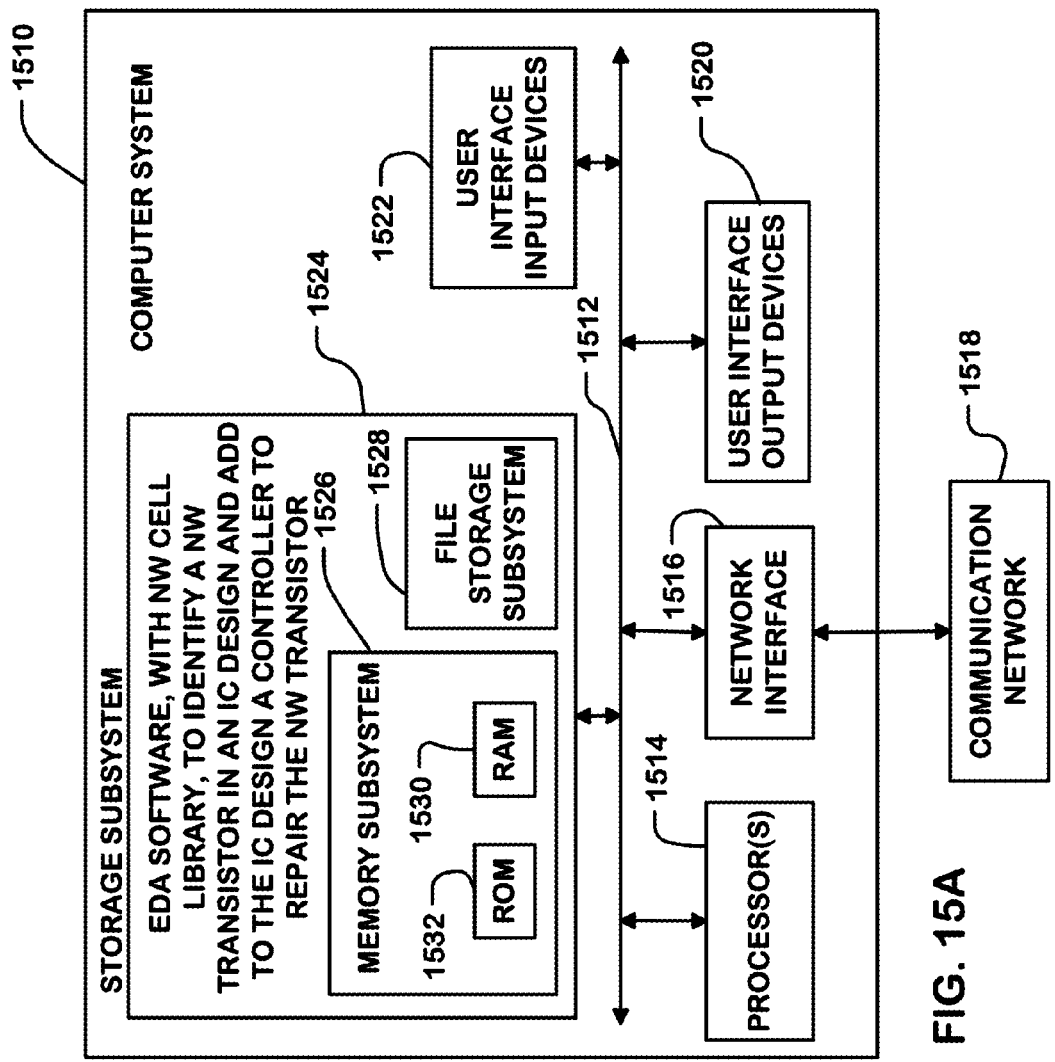
FIG. 15A
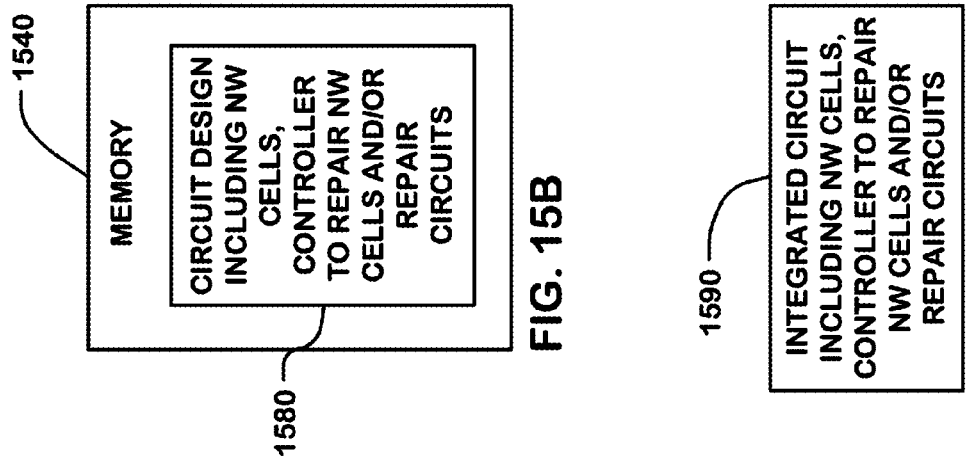
FIG. 15B
FIG. 15C

ENHANCING MEMORY YIELD AND PERFORMANCE THROUGH UTILIZING NANOWIRE SELF-HEATING

CROSS-REFERENCE TO RELATED APPLICATIONS

This application claims the benefit of U.S. Provisional Patent Application No. 62/357,892, entitled "LOGIC TIMING AND RELIABILITY REPAIR UTILIZING NANOWIRE SELF-HEATING," filed on 1 Jul. 2016, U.S. Provisional Patent Application No. 62/384,337, entitled "ENHANCING MEMORY YIELD AND PERFORMANCE THROUGH UTILIZING NANOWIRE SELF-HEATING," filed on 7 Sep. 2016, U.S. Provisional Patent Application No. 62/357,897, entitled "ENHANCING MEMORY YIELD AND PERFORMANCE THROUGH UTILIZING NANOWIRE SELF-HEATING," filed on 1 Jul. 2016, and is a Continuation of U.S. Non-Provisional application Ser. No. 15/634,845, entitled "LOGIC TIMING AND RELIABILITY REPAIR FOR NANOWIRE CIRCUITS," filed 27 Jun. 2017, which claims the benefit of U.S. Provisional Patent Application No. 62/357,892, entitled "LOGIC TIMING AND RELIABILITY REPAIR UTILIZING NANOWIRE SELF-HEATING," filed on 1 Jul. 2016, U.S. Provisional Patent Application No. 62/384,337, entitled "ENHANCING MEMORY YIELD AND PERFORMANCE THROUGH UTILIZING NANOWIRE SELF-HEATING," filed on 7 Sep. 2016, and U.S. Provisional Patent Application No. 62/357,897, entitled "ENHANCING MEMORY YIELD AND PERFORMANCE THROUGH UTILIZING NANOWIRE SELF-HEATING," filed on 1 Jul. 2016, which applications are incorporated herein by reference in their entirety.

FIELD

The present invention relates to on-chip device repair, and more particularly to nanowire device repair, and to electronic design automation relating to the same.

BACKGROUND

Transistors in an integrated circuit have critical performance parameters that have statistical distributions around nominal values caused for example by variability of manufacturing steps. For a particular fabrication process, a foundry typically specifies to designers information about these nominal values and variability. If a chip is designed to work properly only if the nominal values are achieved in a particular manufactured device, then as many as half the manufactured devices will not work. Designers therefore have to design their circuits to a specification that is some amount inferior to the specified nominal values to account for device variability.

Commonly, foundries describe variability of a parameter by assuming it conforms to a Gaussian distribution. The actual distribution may not be exactly Gaussian, but a Gaussian distribution is usually presumed. Such a distribution is characterized by a mean and a standard deviation, where the value of a standard deviation of a parameter from the nominal value is a measure of that parameter's variability. Circuit designers often design their chips to function properly should any critical parameter of a manufactured chip be up to 3 standard deviations inferior to the specified nominal value; so the design target is nominal performance minus three times the standard deviation (also called "3 sigmas"). Manufactured chips that do not meet this 3 sigma window may be discarded.

With the upcoming transition from FinFETs to nanowire transistors, transistor variability is expected to increase, which means that the value of sigma will increase. Thus the 3 sigma margin will also increase, forcing designers to design their chips to a specification that is significantly below the foundry's specified nominal performance parameters. Such wide variabilities also make electronic design automation for high performance integrated circuits more complex.

SUMMARY

A technology, including circuitry, manufacturing methods and improved design automation tools, is provided for reducing the impact of variability in the operating parameters of nanowire-based devices, and improving the performance of electronic design automation tools used in the design process. The technology can enable design, manufacture and use of higher performance circuits. The technology can provide a method for improving an integrated circuit design which has transistors with nanowire channels, including identifying a particular device having a particular transistor with a nanowire channel; and adding to the integrated circuit design a controller which, when activated, repairs the particular transistor by self-heating.

In one aspect of the technology, for improving an integrated circuit design including logic circuitry with devices having transistors with nanowire channels, an automated design method includes adding repair circuits to the design that are coupled to the devices in the circuitry. The repair circuits can apply healing current in some embodiments, that can adjust critical parameters of the devices and the circuit as a whole. The method includes determining a critical path in the logic circuitry, where the critical path includes a particular device having a transistor with a nanowire channel. If the critical path does not safely meet a timing specification given the performance variations of the devices, then a repair circuit can be added to the integrated circuit design connected to the particular device in the critical path, the repair circuit when activated applying a self-heating stress to the particular device in the critical path. In one embodiment, a timing slack of each of a plurality of signal paths in the logic circuitry can be calculated, wherein the step of determining a critical path can comprise choosing a signal path in which the calculated timing slack is negative. A repairable path as used herein refers to a path, which can be a critical path, in logic circuitry in an integrated circuit to which a repair circuit as described herein is connected.

A repair circuit for this purpose can include for example a selection block selecting among a plurality of signals as an input signal to the particular device, the plurality of signals including a repair signal and an operational logic signal, the repair signal being such as to apply the self-heating stress to the nanowire channel of the particular device when activated.

In one embodiment, the design method can include adding a two level power supply to the integrated circuit design, where the two level power supply can provide a first supply voltage and a second supply voltage higher than the first supply voltage. The design method can include adding a controller to the integrated circuit design, where the controller can be configured to provide the second supply voltage to the particular device while selecting the repair signal as the input signal to the particular device via the selection block, and to provide the first supply voltage to the particular device while selecting the operational logic signal as the input signal to the particular device via the selection block. In an alternative embodiment, a single level power supply can be used instead of a two level power supply, to provide a supply voltage to the particular device in applying a stress to the particular device, where the supply voltage is also applied to the particular device in normal logic operation.

In one embodiment, the design method can include adding a signal source to the integrated circuit design to generate the repair signal as a time varying signal causing the particular device to switch repeatedly while powered by the second supply voltage of a two level power supply or by the supply voltage of a single level power supply, at a rate or rates sufficient to induce the self-heating stress to the nanowire channel of the particular device. Preferably the repeated switching involves the particular device switching at a high frequency equal to or significantly exceeding the clock frequency of the logic circuitry when the logic circuitry is powered with a supply voltage VDD to generate a certain amount of Joule heating in the particular device, or switching at a frequency lower than the clock frequency when the logic circuitry is powered with a supply voltage higher than the VDD, to generate the same amount of Joule heating in the particular device. The on-state resistance of a nanowire transistor is higher than that of a FinFET (Fin Field Effect Transistor), and consequently causing the particular device to switch repeatedly as described herein can generate more Joule heating than in a FinFET. The amount of Joule heating generated in a particular device should be enough to cause diffusion into the nanowire channel of source and drain dopants of the transistor in the particular device, but not too much so as to degrade its performance by an irreversible breakdown or creating too much oxide charges.

An integrated circuit can be manufactured with the improved design.

In a manufacturing process, or in the field, an integrated circuit implemented according to the improved integrated circuit design can take advantage of the repair circuits. In one example, a repairable path which has a negative timing slack can be identified in the logic circuitry based on measured timing tests. A stress can be applied on a particular device having a transistor with a nanowire channel in the repairable path to change the timing slack of the repairable path. Identifying a repairable path can comprise sensing speed of the repairable path. Static leakage current of the integrated circuit can be measured, and before applying the stress, it can be determined that the static leakage current of the integrated circuit is below a leakage limit of the integrated circuit.

Applying the stress can cause an increase in the read current through the repairable path including the nanowire channel of the transistor. Applying the stress can induce a self-heating stress to the nanowire channel of the particular device, the self-heating stress causing diffusion into the nanowire channel of source and drain dopants of the transistor in the particular device. Applying the stress can be repeated until the timing slack of the repairable path is not negative, each repetition of said applying the stress doing so for an increased duration than the previous occurrence of said applying the stress.

Applying a stress can include providing the second supply voltage to the particular device, and selecting the repair signal as the input signal to the particular device via the selection block. The repair signal can comprise a time varying signal causing the particular device to switch repeatedly while powered by the second supply voltage, at a rate or rates sufficient to induce the self-heating stress to the nanowire channel of the particular device. In an alternative embodiment, a single level power supply in the integrated circuit can be used instead of a two level power supply, to provide a supply voltage to the particular device in applying a stress to the particular device, where the supply voltage is also applied to the particular device in normal logic operation. In this embodiment, the repair signal can comprise a time varying signal causing the particular device to switch repeatedly while powered by the supply voltage of the single level power supply, at a rate or rates sufficient to induce the self-heating stress to the nanowire channel of the particular device.

An integrated circuit is provided that includes logic circuitry with devices having transistors with nanowire channels. The integrated circuit includes a repairable path in the logic circuitry, the repairable path including a particular device having a transistor with a nanowire channel; and a repair circuit connected to the particular device in the repairable path, the repair circuit including a selection block selecting among a plurality of signals as an input signal to the particular device, the plurality of signals including a repair signal and an operational logic signal, the repair signal being such as to apply a self-heating stress to the nanowire channel of the particular device when activated.

In one embodiment, the integrated circuit can include a two level power supply providing a first supply voltage and a second supply voltage higher than the first supply voltage and a controller. The controller can be configured to provide the second supply voltage to the particular device while selecting the repair signal as the input signal to the particular device via the selection block, and to provide the first supply voltage to the particular device while selecting the operational logic signal as the input signal to the particular device via the selection block. In an alternative embodiment, a single level power supply can be used instead of a two level power supply, to provide a supply voltage to the particular device in applying a stress to the particular device, where the supply voltage is also applied to the particular device in normal logic operation.

The integrated circuit can include a signal source to generate the repair signal as a time varying signal causing the particular device to switch repeatedly while powered by the second supply voltage of a two level power supply or by the supply voltage of a single level power supply, at a rate or rates sufficient to induce the self-heating stress to the nanowire channel of the particular device.

Repair circuits can be added to many devices in many repairable paths in the starting design. Thus, the integrated circuit can include a second repairable path in the logic circuitry, the second repairable path including a second operational logic signal and a second device having a transistor with a nanowire channel, and a second repair circuit connected to the second device, the second repair circuit including a second selection block selecting among a plurality of signals as a second input signal to the second device, the plurality of signals including a second repair signal and a second operational logic signal, the second repair signal being such as to apply a self-heating stress to the nanowire channel of the second device when activated.

In one embodiment, the controller can be configured to select the second operational logic signal as the second input signal to the second device via the second selection block, while the repair signal is selected as the input signal to the particular device. In another embodiment, the controller can be configured to select the second repair signal as the second input signal to the second device via the second selection block, while the repair signal is selected as the input signal to the particular device, the second repair signal being a time varying signal causing the second device to switch repeatedly while powered by the second supply voltage of a two level power supply or by the supply voltage of a single level power supply, at a rate or rates sufficient to induce a self-heating stress to the nanowire channel of the second device. In yet another embodiment, the controller can be configured to select the second repair signal as the second input signal to the second device via the second selection block, while the repair signal is selected as the input signal to the particular device, the second repair signal being a steady signal not causing devices in the second device to switch repeatedly.

In another aspect of the technology, for improving an integrated circuit design including memory cells having transistors with nanowire channels, a method includes adding circuitry configured to perform a repair process on a nanowire channel of a transistor in a memory cell, the transistor on a current path through an intermediate storage node in the memory cell and a bit line connected to the memory cell.

The repair process can include programming the intermediate storage node to a first voltage during a time period; enabling a word line connected to the memory cell, after the intermediate storage node is programmed to the first voltage; and applying a second voltage on the bit line for a duration longer than the time period, the second voltage inducing a repair current to flow through the current path for self-heating the transistor on the current path.

In one instance, the transistor in a memory cell is a first N-type device, the memory cell includes a second N-type device with a nanowire channel, and the intermediate storage node is coupled to the first and second N-type devices, and the first voltage is lower than the second voltage. The memory cell is powered with a supply voltage, and the second voltage can be higher than the supply voltage. A precharge device can be connected to the bit line for precharging the bit line when sensing a read current of the memory cell connected to the bit line, and the second voltage is lower than a sum of the supply voltage and a threshold voltage of the precharge device. Alternatively the second voltage can be substantially equal to the supply voltage. As used herein, the term "substantially" is intended to accommodate manufacturing tolerances.

In another instance, the transistor is a P-type device, the memory cell includes an N-type device with a nanowire channel, the intermediate storage node is coupled to the P-type device and the N-type device, and the second voltage is lower than the first voltage.

An integrated circuit can be manufactured with the improved design.

In a manufacturing process, or in the field, an integrated circuit implemented according to the improved integrated circuit design can take advantage of the added circuitry configured to perform a repair process on a nanowire channel of a transistor in a memory cell. In one example, a memory cell can be determined that has a read current below a passing criteria, where the memory cell has a transistor with a nanowire channel on a current path through which the read current flows. A stress can be applied on the memory cell to repair the nanowire channel of the transistor in the memory cell on the current path. Determining the memory cell can include sensing read currents of memory cells in an array of memory cells, where the memory cells have transistors with nanowire channels on current paths through which the read currents flow, and determining one or more memory cells in the array of memory cells having read currents below the passing criteria, using the read currents sensed. Addresses of the determined one or more memory cells having read currents below the passing criteria can be stored, for identifying memory cells having transistors with nanowire channels that need repairing.

Applying the stress can induce self-heating in the memory cell, the self-heating causing diffusion into the nanowire channel of source and drain dopants of the transistor on the current path in the memory cell. Applying the stress can cause an increase in the read current through the current path including the nanowire channel of the transistor.

Static leakage current of the integrated circuit can be measured, and it can be determined that the static leakage current of the integrated circuit is below a leakage limit of the integrated circuit before the stress is applied on the memory cell.

A second memory cell can be determined that has a second read current below a passing criteria, where the second memory cell has a second transistor with a nanowire channel on a current path through which the second read current flows. It can be determined whether the static leakage current of the integrated circuit is below a leakage limit of the integrated circuit. Only if so, a stress can be applied on the second memory cell to repair the nanowire channel of the second transistor in the second memory cell on the second current path.

Applying the stress on the memory cell can be repeated, until the read current is not below the passing criteria, each repetition of said applying the stress doing so for an increased duration than the previous occurrence of said applying the stress.

Particular aspects of the present technology are described in the claims, specification and drawings.

BRIEF DESCRIPTION OF THE FIGURES

The present invention is illustrated by way of example, and not by way of limitation, in the figures of the accompanying drawings and in which like reference numerals refer to similar elements and in which:

FIGS. 5A and 5B are tables showing circuit path timing, referred to in order to illustrate how to identify a critical path.

FIGS. 15A, 15B and 15C are simplified block diagrams of a computer system suitable for use with embodiments of the present technology, as well as repair circuit embodiments of the technology.

DETAILED DESCRIPTION

The following detailed description is made with reference to the figures. Preferred embodiments are described to illustrate the present technology, not to limit its scope, which is defined by the claims. Those of ordinary skill in the art will recognize a variety of equivalent variations on the description that follows.

Figure 1:
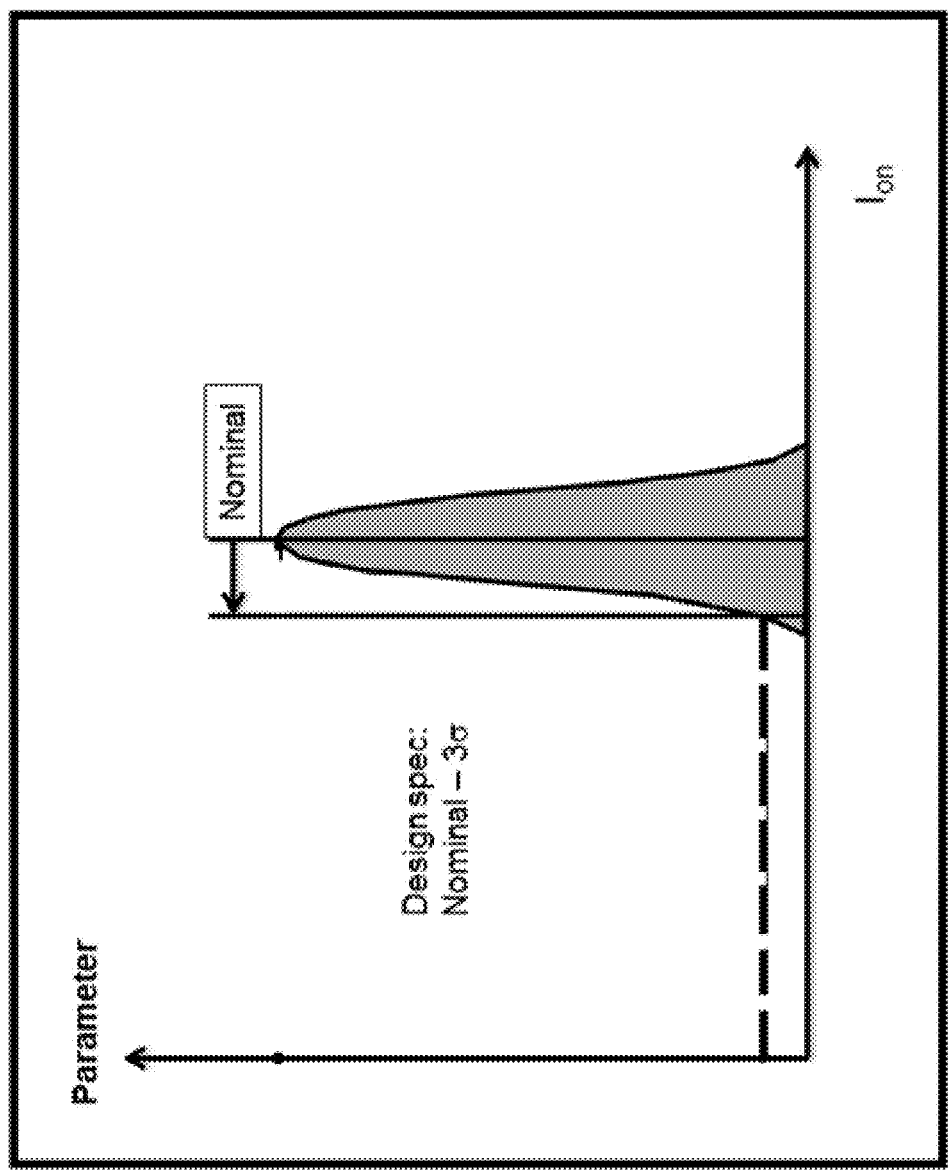
FIG. 1 is a representation of a normal distribution of the on-state transistor current (Ion) of the transistors on the chip.

FIG. 1 is a representation of a normal distribution of the on-state transistor current (Ion) of the transistors on a chip. The minus 3σ cut-off point represents the value of Ion below which the device will not meet the passing criteria for use in a design. This is reflected in the design practice of simulating circuits in a range of +/−3σ for the key device performance metrics to establish the acceptable design target.

Figure 2:
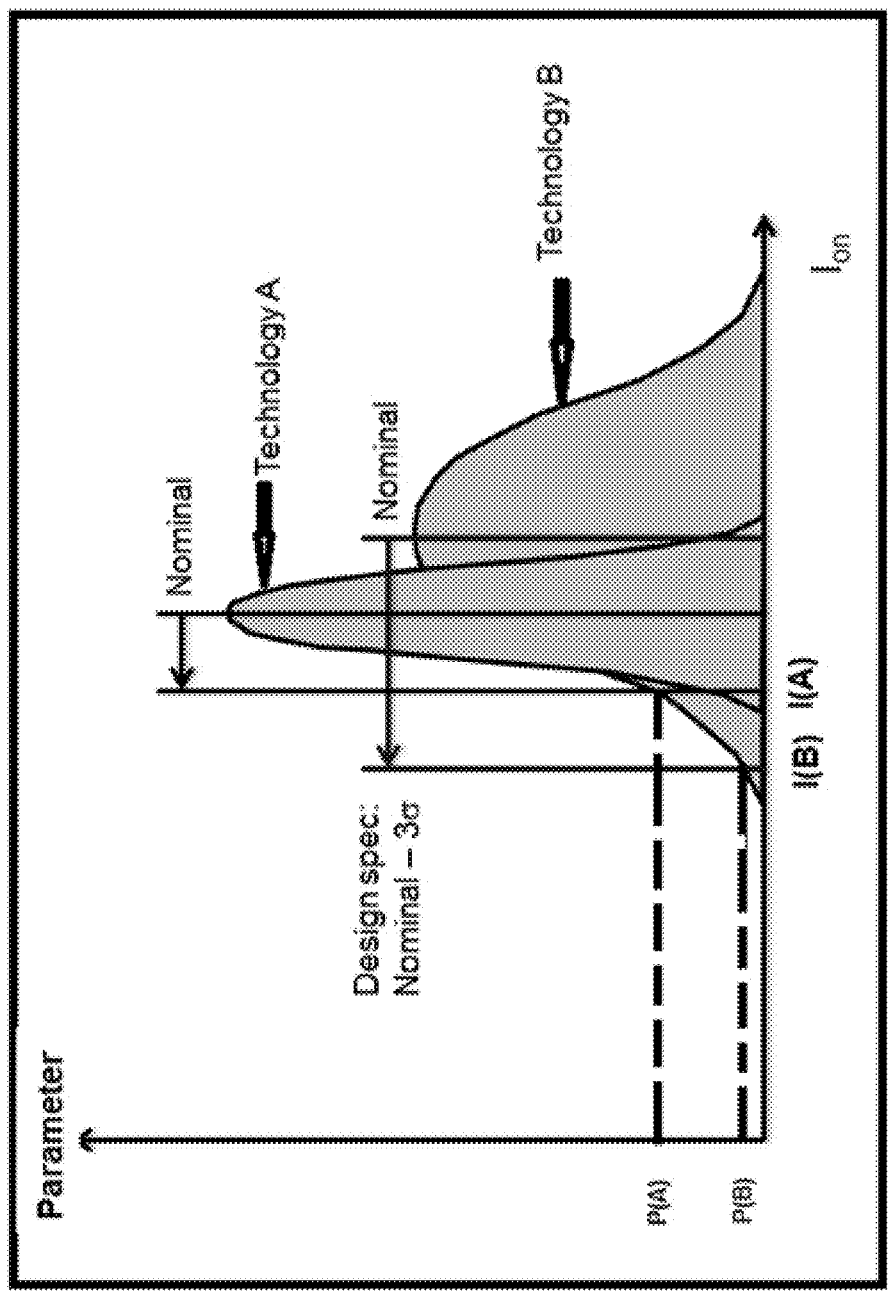
FIG. 2 is a representation of two normal distributions of the on-state transistor current (Ion) for two different technologies.

FIG. 2 is a representation of two normal distributions of the on-state transistor current (Ion) for two different technologies A and B. Technology A has a lower mean value of Ion but a tighter variability distribution than technology B that has a higher mean value of Ion but also has a wider variability distribution.

I(A) represents the −3σ Ion that is the minimum acceptable value of Ion for a particular design performance. The shaded area under the distribution for technology B between P(A)/I(A) and P(B)/I(B) represent wasted yield due to the wider distribution of technology B.

Technology B, with a higher mean value of Ion indicates a capability of higher overall performance, yet the higher variability translates to a worse performance than A for the typical nominal −3σ Ion circuit design target. The design tools, manufacturing methods and circuits described herein address this problem.

Figure 3:
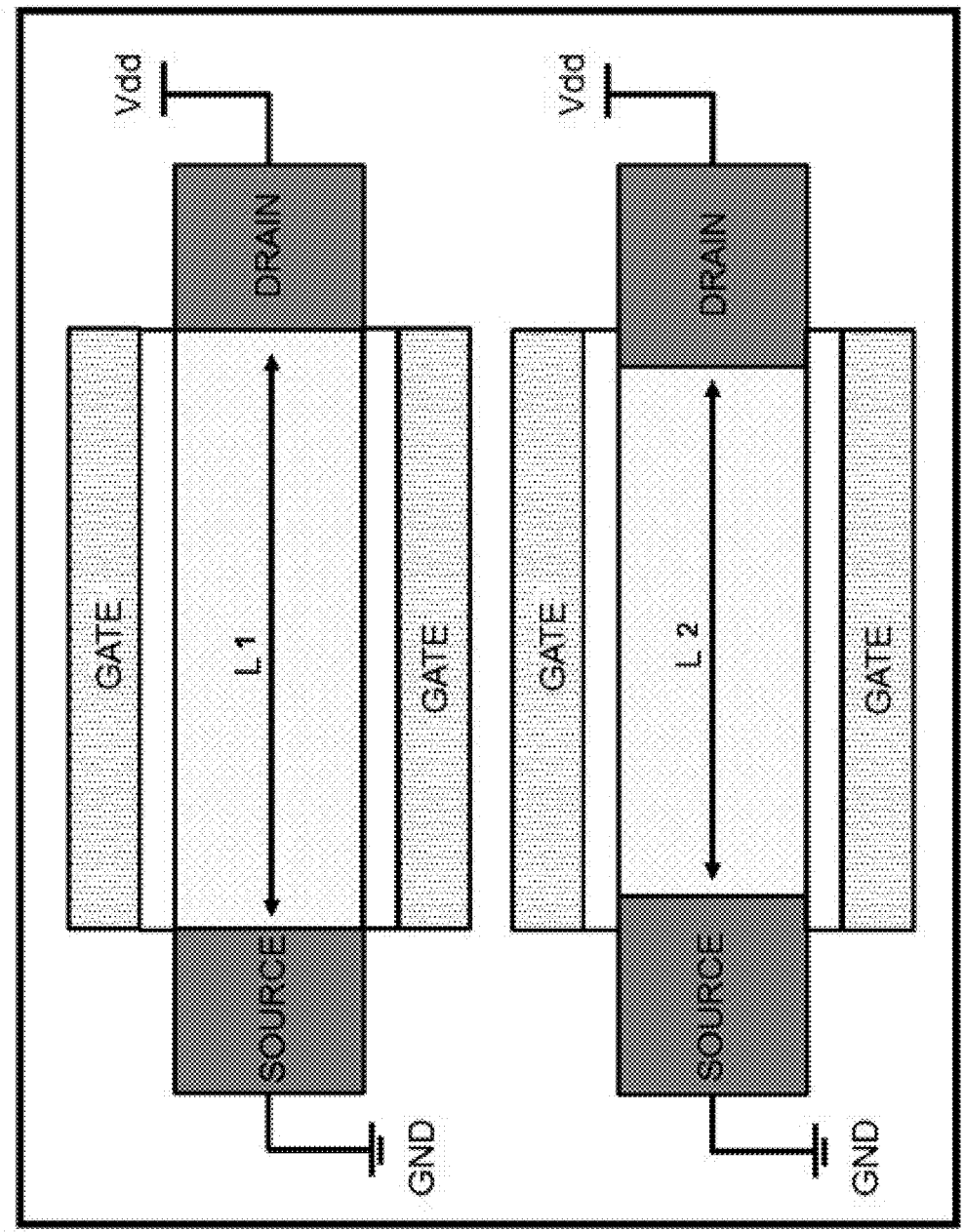
FIG. 3 is a representation of the cross section of a Gate-All-Around (GAA) nanowire (NW) transistor before and after the repair.

FIG. 3 is a cross section representation of a Gate All Around (GAA) nanowire transistor with a channel length L1 with the standard source, drain, and gate configuration. This is one example of a transistor with a nanowire channel which can be part of a critical path in a logic circuit design. In the illustration, the "upper" and "lower" gates are in reality a single gate wrapped around the channel between the source and the drain.

The GAA nanowire transistor with channel length L2 represents the transistor of channel L1 after a higher VDD is applied to it for a period of time. The self-heating can be applied to a device on the low Ion tail of the distribution, where the self-heating of the transistor causes the source and drain dopants to diffuse further into the channel resulting in L2 smaller than L1. With a shorter effective channel length, the on-resistance of the transistor is reduced and the on-current Ion can be higher. This results in the probability curve for the transistor being repaired to shift, so that the left 3σ portion of the Ion distribution curve of the transistors shown in FIGS. 1 and 2 shifts to the right and narrows the distribution as shown in FIG. 4, whenever selected slower transistors go through a self-heating repair step.

Figure 4:
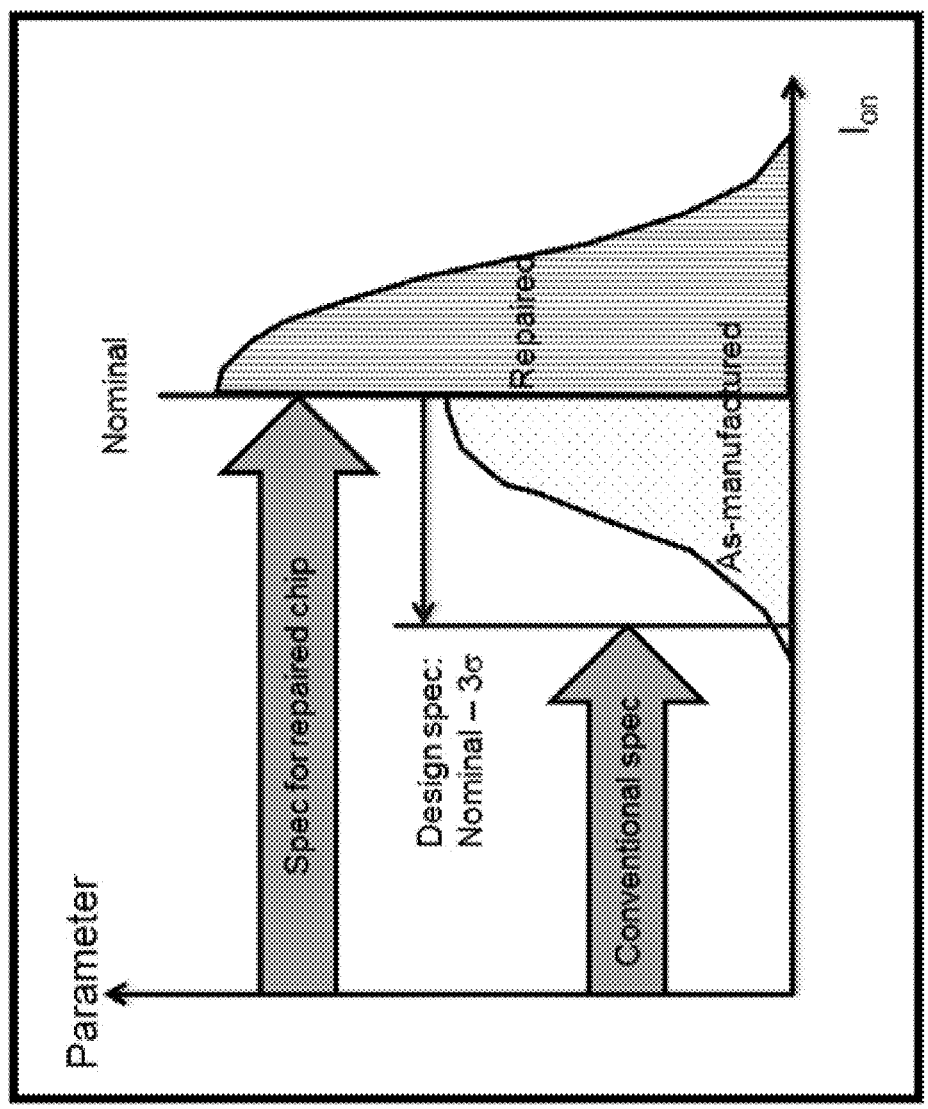
FIG. 4 is a representation of the distribution of transistor's on-state current before and after device repair.

FIG. 4 is a representation of the distribution of transistor's on-state current before and after device repair on a GAA transistor for that particular device and technology. FIG. 4 shows a case where the stress VDD level and duration results in shifting the curve for the stressed transistors by a full 3σ, essentially eliminating in full the left 3σ portion of the distribution curve. The asymmetry of the curve is an indication that the stress is applied only to devices with Ion less than the mean. It is also important to indicate that the stress level need not be that extreme. Any amount of shift to the right is a net gain in performance and in yield.

Improving the performance of a device through stress/self-heating which reduces the effective channel length can have an undesired consequence of higher static leakage in an integrated circuit. Thus in a process to apply a stress to repair a device on the integrated circuit, the static leakage of the integrated can be first measured. If the static leakage of the integrated circuit is below a leakage limit of the integrated circuit, then a stress can be applied to a device having a transistor with a nanowire channel in a critical path to change the timing slack of the critical path. Otherwise the static leakage of the integrated circuit is at or exceeding the leakage limit, and a stress may not be applied to a device having a transistor with a nanowire channel in a critical path.

FIGS. 5A and 5B are tables showing circuit path timing, referred to in order to illustrate how to identify a critical path.

FIG. 5A shows paths 1 to n, having starting devices in the second column, ending devices in the third column, and picosecond scale timing slack measurements on the paths in the fourth column. The maximum clock frequency of a logic circuit is governed by the register to register delay which usually includes a critical path. The paths are between starting registers and ending registers that operate on a same clock signal. The slacks refer to the timing differences between register to register delays relative to a time period required to operate with a target clock frequency of the clock signal.

The slacks can be positive slacks or negative slacks. A positive slack indicates that the cumulative delay through circuit elements between registers is less than the period, and therefore will not limit the clock frequency to below the target clock frequency. A negative slack indicates that the cumulative delay through circuit elements between registers is greater than the period, and therefore the target clock frequency cannot be met with a negative slack.

In this example, the slacks are calculated relative to a target clock frequency of 1 GHz corresponding to a period of 1 ns between registers. For instance, Path 1 starts at a first node DF11:CLK, ends at a second node O11, and has a slack of −33 ps; Path 2 starts at a first node A2:CLK, ends at a second node O23, and has a slack of −24 ps; Path 3 starts at a first node DF23:CLK, ends at a second node O11, and has a slack of −12 ps; . . . and Path n starts at a first node DF12:CLK, ends at a second node O7, and has a slack of 29 ps.

A critical path can be a path that has the worst negative slack as compared to the slacks of other paths between registers operating on the same clock signal. For instance, among the example paths, the critical path can be Path 1 with a slack of negative 33 ps.

FIG. 5B shows breakdown of the example critical path Path 1. In this example, the critical path includes a cumulative delay of 45 ps from a clock input of a register (e.g. DF11:CLK) to a first intermediate node int1 at an output of the register (e.g. DF11:q). The cumulative delay increases to 189 ps at a second intermediate node int 2 at an output of a combinational gate (e.g. OR2D1:Z) on the critical path. The cumulative delay increases to 1033 ps at a third intermediate node int 3 at an output of another combinational gate (e.g. XOR:Z) on the critical path. Since the target clock frequency is 1 GHz, corresponding to a period of 1 ns between registers, the cumulative delay of 1033 ps is 33 ps slower than the period of 1 ns, and accordingly the slack is negative 33 ns.

Figure 6:
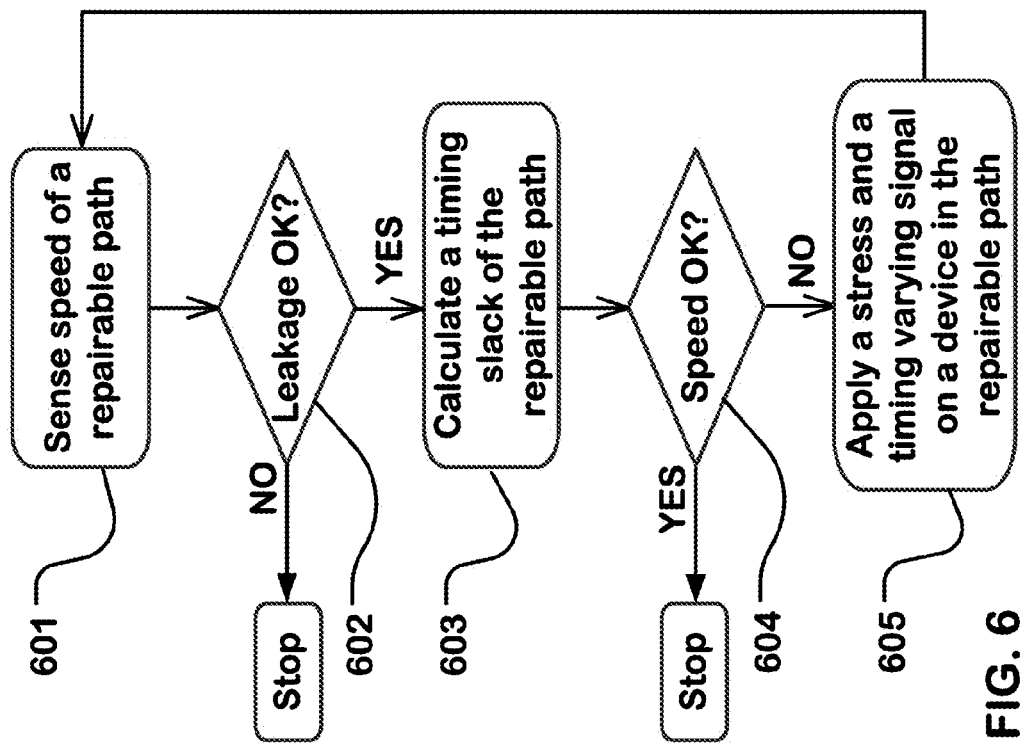
FIG. 6 is an example flow chart for identifying in the logic circuitry a repairable path which has a negative timing slack, and applying a stress on a particular device having a transistor with a nanowire channel in the repairable path to change the timing slack of the repairable.

FIG. 6 is an example flow chart for identifying in the logic circuitry a repairable path which has a negative timing slack, and applying a stress on a particular device having a transistor with a nanowire channel in the repairable path to change the timing slack of the repairable path. Steps described in FIG. 6 can be implemented using an apparatus such as described in connection with FIG. 16.

At Step 601, speed of a repairable path in the logic circuitry is sensed, where the repairable path includes a particular device having a transistor with a nanowire channel. Speed of a repairable path in the logic circuitry can be sensed during manufacturing using a semiconductor test system (e.g. 1610, FIG. 16) before packaging, such as in wafer form in some embodiments, or in a packaged form in other embodiments. Alternatively, an integrated circuit can include built-in circuits to sense speed of a repairable path in the logic circuitry on the integrated circuit.

At Step 602, the static leakage current of the integrated circuit or a part of the integrated circuit is measured. Before applying the stress at Step 605, the static leakage current is determined as below a leakage limit. This is because improving the performance of a device through stress/self-heating can have the undesired consequence of higher static leakage current for an integrated circuit. Thus the application of stress is administered selectively when the static leakage current of the integrated circuit is below a leakage limit of the integrated circuit or a part of the integrated circuit.

At Step 603, a timing slack of the repairable path is calculated, using the speed sensed for the repairable path based on measurements.

At Step 604, it is determined if the calculated timing slack is negative. If the calculated timing slack is negative, the flow for repairing logic circuitry can proceed to Step 605, otherwise the flow can stop.

At Step 605, a stress is applied on a particular device having a transistor with a nanowire channel in the repairable path with the negative timing slack to change the timing slack of the repairable path. Applying the stress can induce self-heating in the particular device. The self-heating can cause diffusion into the nanowire channels of source and drain dopants of the particular device.

The flow can repeat Step 605 on the repairable path, until the timing slack of the repairable path is not negative, each repetition of said applying the stress doing so for an increased duration than the previous occurrence of said applying the stress (Step 604→Yes), or the static leakage current of the integrated circuit is no longer below a leakage limit of the integrated circuit (Step 602→No). In an alternative embodiment, Steps 601-605 can be repeated on a different transistor with a nanowire channel in the same repairable path, until either the calculated timing slack is not negative (Step 604→Yes), or the static leakage current of the integrated circuit is no longer below a leakage limit of the integrated circuit (Step 602→No). In an embodiment, the performance of each cell being repaired is re-measured (sensed) again after an increment of repair heating time, and the repair is repeated if still needed. The process can be repeated until the target performance is achieved. In a different embodiment, Step 602 for checking static leakage current could be performed after Step 603 for calculating a timing slack, but before Step 605 for applying the stress.

The flow described in FIG. 6 can be applied to multiple repairable paths, until either the static leakage current of the integrated circuit is no longer below a leakage limit of the integrated circuit (Step 602→No), or there are no more remaining repairable paths with negative timing slacks (Step 604→Yes).

In one embodiment, the flow can repair only one repairable path with a negative timing slack that stands in the way for the whole integrated circuit to achieve a higher frequency. In an alternative embodiment, the flow can repair a few repairable paths with negative timing slacks that stand in the way for the whole integrated circuit to achieve a higher frequency. In yet other embodiments, the flow can repair all repairable paths with negative timing slacks in an integrated circuit.

Figure 7:
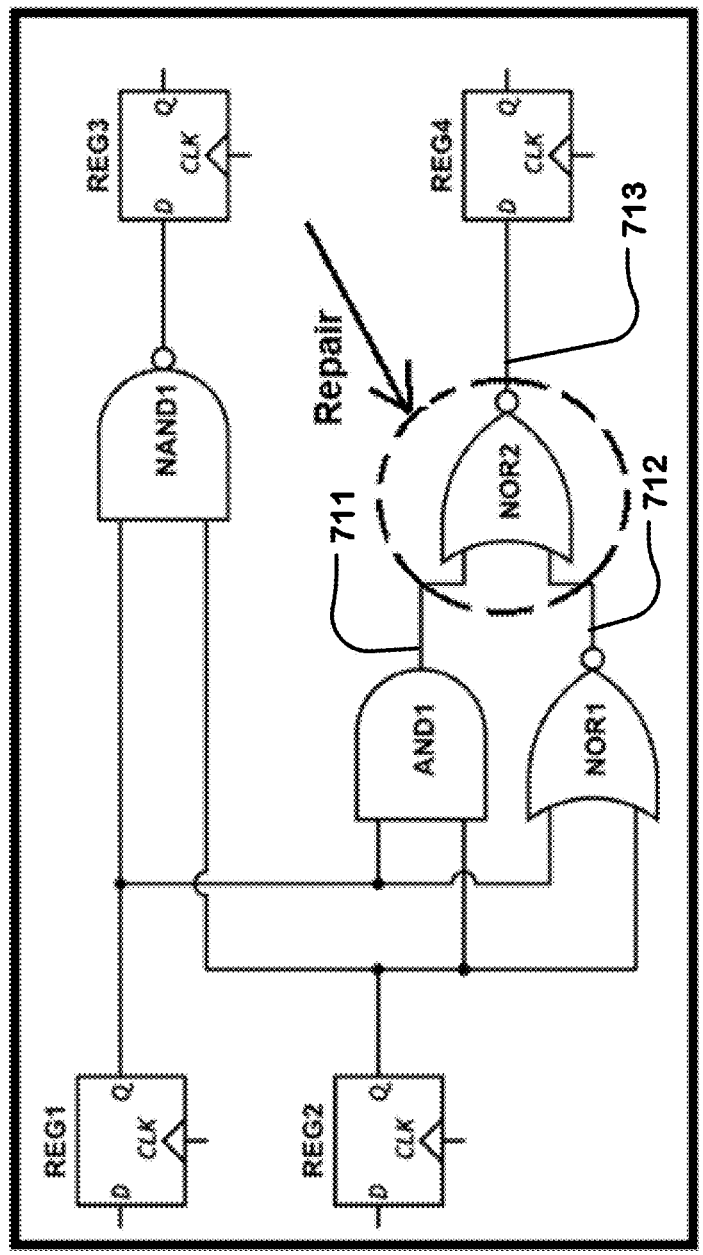
FIG. 7 is a representation of logic circuitry including a particular device in a critical path.

FIG. 7 is a logic diagram of an embodiment of a circuit for which selective application of stress can be deployed to enhance system performance of an integrated circuit design. The performance of the circuit is determined by the slower of the multiple paths from the Q output of each of registers REG1 and REG2 to the D input of each of registers REG3 and REG4.

For instance, a path from register REG2 to register REG4 including the NOR2 gate is the slower of the multiple paths. The NOR2 gate is targeted for stress to enhance its speed resulting in a faster path from register REG2 to register REG4 improving the performance of the whole circuit. The NOR2 gate is connected to two input signals (e.g. 711, 712) and an output signal (e.g. 713).

Figure 8:
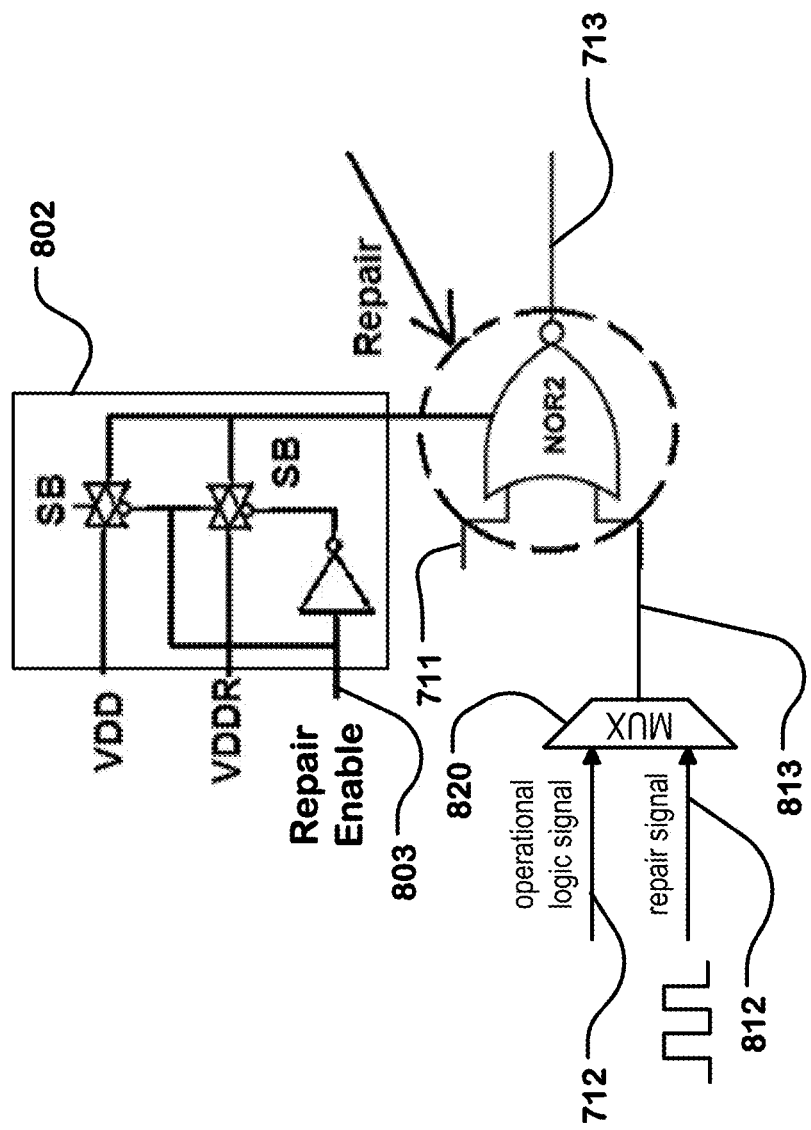
FIG. 8 illustrates a repair circuit connected to a particular device in a critical path.

FIG. 8 illustrates a repair circuit connected to a particular device in a critical path. As shown in the example of FIG. 8, a repair circuit (e.g. 820) is connected to a particular device (e.g. NOR2) in a critical path (e.g. from REG2 to REG4, FIG. 7). The repair circuit when activated can apply a self-heating stress to the particular device in the critical path. The repair circuit 820 can include a selection block that selects among a plurality of signals including a repair signal (e.g. 812) and an operational logic signal (e.g. 712, FIG. 7) as an input signal to the particular device NOR2, and provides an output signal (e.g. 813). The repair signal is such as to apply the self-heating stress to the nanowire channel of the particular device when activated. The particular device NOR2 is connected to a first input signal (e.g. 711, FIG. 7), a second input signal (e.g. 813), and an output signal (e.g. 713, FIG. 7).

In one embodiment, the integrated circuit can include a two level power supply. The two level power supply has a normal VDD output for normal chip operation, and also a VDDR output, which has a higher voltage than the VDD output, available for stressing desired transistors having nanowire channels for the purposes of repairing the transistors. A switch 802 is provided which normally connects VDD to all of the circuitry blocks. But when a Master Repair Enable signal 803 is asserted, the switch 802 instead connects VDDR to a gate (e.g. NOR2) in a critical path that needs repairing, via power supply distribution lines (e.g. 804, FIG. 8). In an alternative embodiment, a single level power supply can be used instead of a two level power supply, to provide a supply voltage to the particular device in applying a stress to the particular device, where the supply voltage is also applied to the particular device in normal logic operation.

The repair signal can be a time varying signal causing the particular device to switch repeatedly while powered by the second supply voltage of a two level power supply or by the supply voltage of a single level power supply, at a rate or rates sufficient to induce the self-heating stress to the nanowire channel of the particular device.

Figure 9:
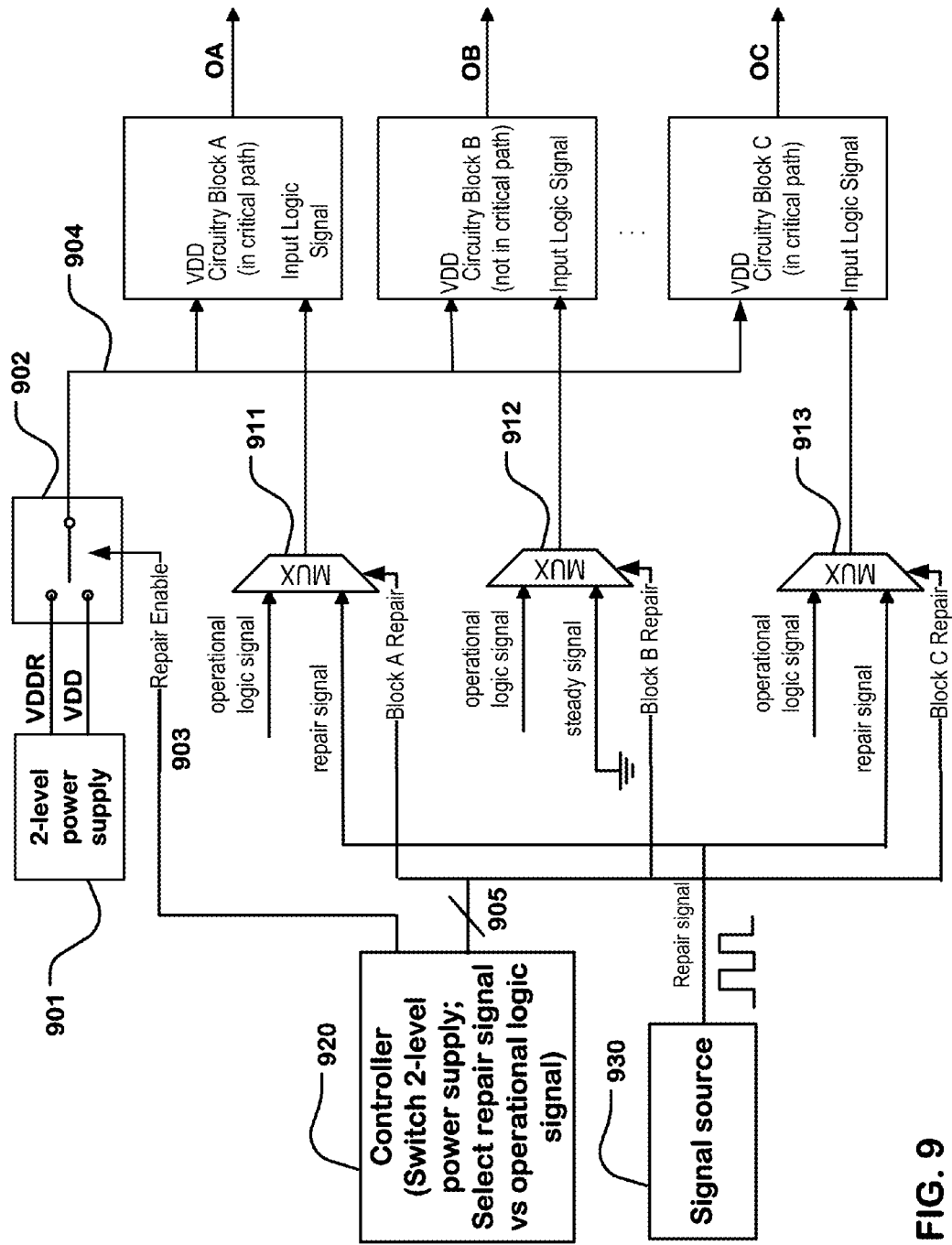
FIG. 9 illustrates multiple repair circuits connected to circuitry blocks including circuitry blocks having critical paths.

FIG. 9 illustrates multiple repair circuits connected to circuitry blocks including circuitry blocks having repairable paths. In general, the circuitry on-chip can be organized into circuitry blocks, some of which contain transistors in a repairable path and others not. In FIG. 9, for example, circuitry blocks A and C contain repairable path circuitry whereas circuitry block B does not. A two level power supply 901 is provided, which has a normal VDD output for normal chip operation, and also a VDDR output, which has a higher voltage than the VDD output, available for stressing desired transistors having nanowire channels for the purposes of repairing the transistors.

A switch 902 is provided which normally connects VDD to all of the circuitry blocks. But when a Master Repair Enable signal 903 is asserted, the switch 902 instead connects VDDR to the power supply distribution lines 904. Each circuitry block has an input logic signal in response to which it generates its output(s), e.g. OA, OB and OC for circuitry blocks A, B and C respectively. Only one input and one output are shown, but it will be appreciated that each circuitry block can have numerous inputs and numerous outputs. The input logic signal for each of the circuitry blocks is connected to the output of a respective selection block (e.g. 911, 912, 913). The selection block for each of the circuitry blocks A and C, which do have repairable path circuitry, has one input carrying the operational logic signal for the circuitry block, and a second input carrying a time varying signal such as a square wave signal. In an embodiment, the square wave signal holds steady at one logic value unless the Master Repair Enable signal is asserted. The "operational logic signal" is a signal from upstream circuitry (not shown) which is used in normal chip operation. For circuitry block B, which does not have a repairable path, the selection block (e.g. 912) has one input carrying the operational logic signal and the second input carrying a fixed or steady logic signal such as '0'. Each selection block also has a Block x Repair enable signal which is asserted by a controller (e.g. 920) for each block x to be repaired, where 'x' refers to 'A', 'B' or 'C' as in Block A, Block B or Block C. In one embodiment the block repair enable signals are asserted one at a time, whereas in another embodiment two or more of them can be asserted concurrently.

In normal operation, the Master Repair Enable signal 903 is not asserted, all of the circuitry blocks are powered with VDD, and all of the selection blocks are set to select their operational logic signals to their respective circuitry blocks. At repair time, the Master Repair Enable signal 903 is asserted, causing all of the circuitry blocks to be powered by the higher repair voltage VDDR. This does not by itself cause significant repair heating, since a transistor is heated significantly only while current flows through it. In logic circuitry, significant current flows only while the circuitry is in the process of switching. Thus to cause heating of repairable transistors in the repairable path, the embodiment of FIG. 9 replaces the operational logic signal for each desired circuitry block with a time varying repair signal so as to cause the transistors in the repairable path to switch repeatedly. This is accomplished by asserting the Block x Repair enable signal for each desired circuitry block x, thereby passing the time varying repair signal to the input logic port of the circuitry block while the circuitry block is being powered by VDDR. For circuitry blocks not in the repairable path, the corresponding Block Repair signal is asserted so as to force the circuitry block to receive only the steady signal. Alternatively, the corresponding Block Repair signal is never asserted (and/or the selection block is omitted entirely), and upstream logic keeps the corresponding operational logic signal steady while the Master Repair Enable signal is asserted. After repairs are complete, none of the Block x Repair enable signals remain asserted, so that only operational logic signals are passed to the circuitry blocks. The Master Repair Enable signal also is de-asserted, so that all of the circuitry blocks are again powered by standard VDD. The integrated circuit can include a signal source 930 to generate the repair signal as a time varying signal causing the transistors in the repairable path to switch repeatedly, at a rate or rates sufficient to induce the self-heating stress to the nanowire channels of the transistors in the repairable path.

In another embodiment, both VDD and VDDR can be provided to all of the circuitry blocks (or all the circuitry blocks that have repairable path circuitry), and a separate power supply switch is provided for each of the circuitry blocks. Only the circuitry blocks that are being repaired have their power supply switches set to apply the repair voltage VDDR.

Figure 10:
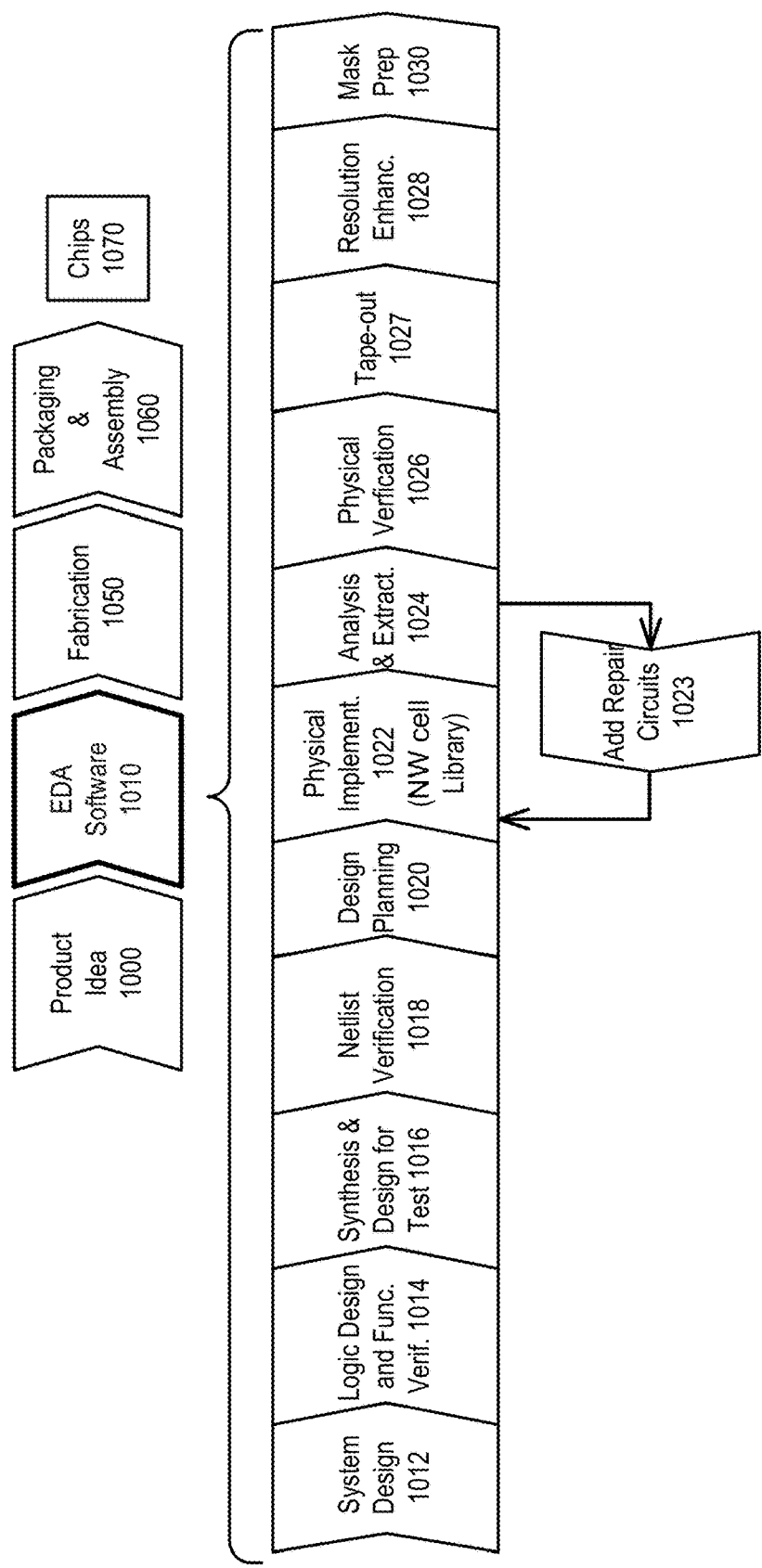
FIG. 10 illustrates a simplified representation of an illustrative integrated circuit design flow.

FIG. 10 illustrates a simplified representation of an illustrative integrated circuit design flow. As with all flowcharts herein, it will be appreciated that many of the steps of FIG. 10 can be combined, performed in parallel or performed in a different sequence without affecting the functions achieved. In some cases a rearrangement of steps will achieve the same results only if certain other changes are made as well, and in other cases a rearrangement of steps will achieve the same results only if certain conditions are satisfied.

At a high level, the process of FIG. 10 starts with the product idea (block 1000) and is realized in an EDA (Electronic Design Automation) design process (block 1010) which is improved by the technology described herein. When the design is finalized, the fabrication process (block 1050) and packaging and assembly processes (block 1060) occur, ultimately resulting in finished integrated circuit chips (result 1070).

The EDA design process (block 1010) is actually composed of a number of steps 1012-1030, shown in linear fashion for simplicity. In an actual integrated circuit design process, the particular design might have to go back through steps until certain tests are passed. Similarly, in any actual design process, these steps may occur in different orders and combinations. This description is therefore provided by way of context and general explanation rather than as a specific, or recommended, design flow for a particular integrated circuit.

A brief description of the component steps of the EDA design process (block 1010) will now be provided.

System design (block 1012): The designers describe the functionality that they want to implement; they can perform what-if planning to refine functionality; check costs; etc. Hardware-software architecture selection can occur at this stage. Example EDA products that have been available from Synopsys, Inc. that could be used at this step include Model Architect, Saber, System Studio, and DesignWare® products.

Logic design and functional verification (block 1014): At this stage, high level description language (HDL) code, such as the VHDL or Verilog code, for modules in the system is written and the design is checked for functional accuracy. More specifically, the design is checked to ensure that it produces the correct outputs in response to particular input stimuli. Example EDA products that have been available from Synopsys, Inc. that could be used at this step include VCS, VERA, DesignWare®, Magellan, Formality, ESP and LEDA products.

Synthesis and design for test (block 1016): Here, the VHDL/Verilog is translated to a netlist. The netlist can be optimized for the target technology. Additionally, the design and implementation of tests to permit checking of the finished chip occur. Example EDA products that have been available from Synopsys, Inc. that could be used at this step include Design Compiler®, Physical Compiler, Test Compiler, Power Complier, FPGA Compiler, TetraMAX, and DesignWare® products. Optimization of design for use of nanowire cells as described herein can occur in this stage.

Netlist verification (block 1018): At this step, the netlist is checked for compliance with timing constraints and for correspondence with the VHDL/Verilog source code. Example EDA products that have been available from Synopsys, Inc. that could be used at this step include Formality, PrimeTime, and VCS products.

Design planning (block 1020): Here, an overall floor plan for the chip is constructed and analyzed for timing and top-level routing. Example EDA products that have been available from Synopsys, Inc. that could be used at this step include Astro and IC Compiler products. Nanowire based cell selection, layout and optimization can occur at this stage.

Physical implementation (block 1022): The placement (positioning of circuit elements) and routing (connection of the same) occurs at this step. Example EDA products that have been available from Synopsys, Inc. that could be used at this step include AstroRail, Primetime, and Star RC/XT products. Nanowire based cell layout, mapping and interconnect arrangements can be implemented or optimized at this stage, using for example nanowire cells based on nanowire cell layouts and structures described herein.

Analysis and extraction (block 1024): At this step, the circuit function is verified at a transistor level; this in turn permits what-if refinement. Example EDA products that have been available from Synopsys, Inc. that could be used at this stage include Custom Designer, AstroRail, PrimeRail, Primetime, and Star RC/XT products.

In accordance with the technology described herein, to add repair circuits in an integrated circuit design including logic circuitry with devices having transistors with nanowire channels, a critical path in the integrated circuit design can be determined (block 1024), where the critical path includes a particular device having a transistor with a nanowire channel (block 1022). If the critical path does not meet a timing specification, then a repair circuit (or a plurality of repair circuits) as discussed above can be added to the integrated circuit design connected to the particular device in the critical path. (block 1023). The repair circuit when activated can apply a self-heating stress to the particular device in the critical path.

At this stage (block 1023), the EDA design process can add to the integrated circuit design a two level power supply which provides a first supply voltage and a second supply voltage higher than the first supply voltage. The EDA design process can add to the integrated circuit design a controller configured to provide the second supply voltage to the particular device while selecting the repair signal as the input signal to the particular device via the selection block, and to provide the first supply voltage to the particular device while selecting the operational logic signal as the input signal to the particular device via the selection block.

At this stage (block 1023), the EDA design process can also add a signal source to the integrated circuit design to generate the repair signal as a time varying signal causing the particular device to switch repeatedly while powered by the second supply voltage of a two level power supply or by the supply voltage of a single level power supply, at a rate or rates sufficient to induce the self-heating stress to the nanowire channel of the particular device.

Physical verification (block 1026): At this stage various checking functions are performed to ensure correctness for: manufacturing, electrical issues, lithographic issues, and circuitry. Example EDA products that have been available from Synopsys, Inc. that could be used at this stage include the Hercules product.

Tape-out (block 1027): This stage provides the "tape-out" data for production of masks for lithographic use to produce finished chips. Example EDA products that have been available from Synopsys, Inc. that could be used at this stage include the CATS® family of products.

Resolution enhancement (block 1028): This stage involves geometric manipulations of the layout to improve manufacturability of the design. Example EDA products that have been available from Synopsys, Inc. that could be used at this stage include Proteus/Progen, ProteusAF, and PSM-Gen products.

Mask preparation (block 1030): This stage includes both mask data preparation and the writing of the masks themselves. Example EDA products that have been available from Synopsys, Inc. that could be used at this stage include CATS® family of products.

Embodiments of the nanowire based technologies described herein can be used during one or more of the above-described stages, including for example one or more of stages 1016 through 1022 and 1030. Also, nanowire cell technology provide flexibility that enables the implementation of engineering change orders ECOs, including modification of the cell sizes during design verification stages.

Figure 11:
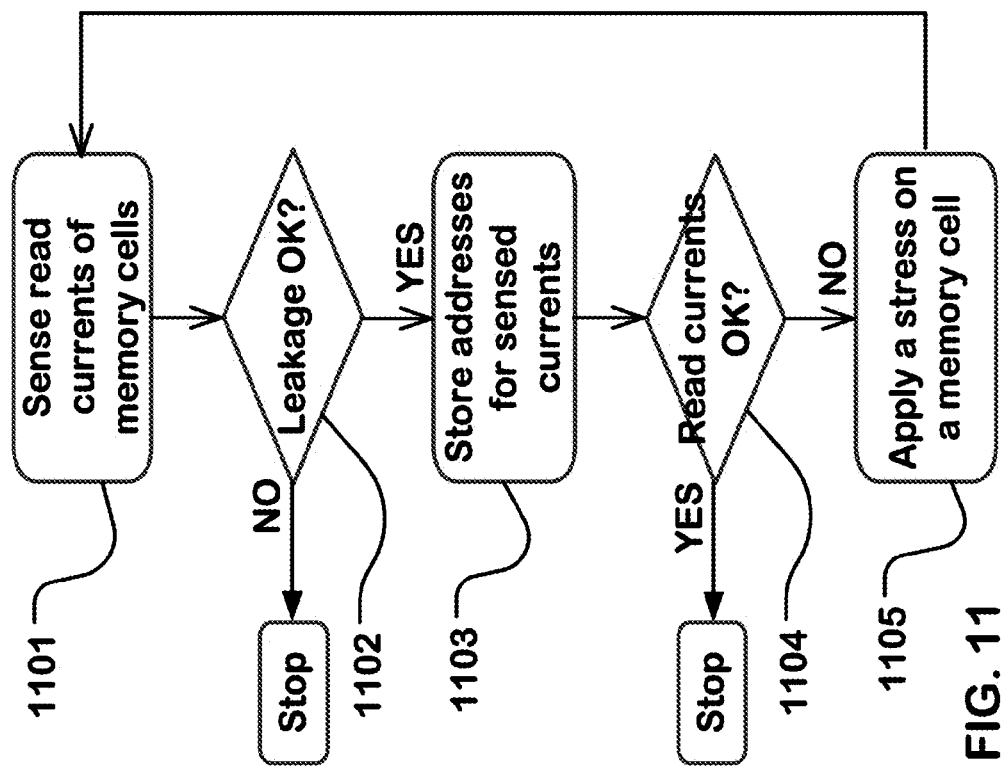
FIG. 11 is an example flow chart for repairing memory cells having transistors with nanowire channels on an integrated circuit.

FIG. 11 is an example flow chart for repairing memory cells having transistors with nanowire channels on an integrated circuit. Steps described in FIG. 11 can be implemented using an apparatus such as described in connection with FIG. 16.

At Step 1101, read currents of memory cells in an array of memory cells are sensed, where the memory cells have transistors with nanowire channels on current paths through which the read currents flow. One or more memory cells in the array of memory cells can be determined that have read currents below a passing criteria, using the read currents sensed. Read currents of memory cells in an array memory cells can be sensed during manufacturing using a semiconductor test system (e.g. 1610, FIG. 16) before packaging, such as in wafer form in some embodiments, or in a packaged form in other embodiments. Alternatively, an integrated circuit can include built-in circuits to sense read currents of memory cells on the integrated circuit.

At Step 1102, static leakage current of the integrated circuit or a part of the integrated circuit is measured. If the static leakage current is below a leakage limit, then the flow for repairing memory cells can proceed to Step 1103, otherwise the flow can stop. This is because improving the performance of a device through stress/self-heating can have the undesired consequence of higher static leakage current for an integrated circuit. Thus the application of stress is administered selectively when the static leakage current of the integrated circuit is below a leakage limit of the integrated circuit or a part of the integrated circuit.

At Step 1103, addresses of the memory cells whose read currents are sensed can be stored, for example for identifying memory cells having transistors with nanowire channels that need repairing. In one embodiment, addresses of the determined one or more memory cells having read currents below the passing criteria can be stored. Furthermore, respective currents of the determined one or more memory cells can be stored along with their addresses. In an alternative embodiment, addresses of all memory cells in the array of memory cells and their respective currents can be stored.

At Step 1104, it is determined whether read currents in all memory cells in an array of memory cells have passed the passing criteria. If yes, the flow can stop. If not, the flow can proceed to Step 1105 to repair a memory cell whose read current has not passed the passing criteria.

At Step 1105, a stress can be applied on a memory cell having a read current below the passing criteria to repair the nanowire channel of the transistor in the memory cell on the current path through which the read current flows. Applying the stress can induce self-heating in the memory cell. The self-heating can cause diffusion into the nanowire channels of source and drain dopants of the transistor on the current path in the memory cell.

After Step 1105, the flow can repeat Steps 1101-1105, using an incremented time duration for applying the stress, until either the read current is not below the passing criteria (Step 1104→Yes), or the static leakage current of the integrated circuit is no longer below a leakage limit of the integrated circuit (Step 1102→No). Steps 1101-1105 can be repeated on a different transistor with a nanowire channel in the same memory cell. In an embodiment, the performance of each memory cell being repaired is re-measured (sensed) again after an increment of repair heating time, and the repair is repeated if still needed. The process can be repeated until the target performance is achieved. In a different embodiment, Step 1102 for checking static leakage current could be performed after Step 1103 for storing addresses of the memory cells whose read currents are sensed, but before Step 1105 for applying the stress.

The flow described in FIG. 11 can be applied to multiple memory cells, until either the static leakage current of the integrated circuit is no longer below a leakage limit of the integrated circuit (Step 1102→No), or there are no more remaining memory cells with read currents below the passing criteria (Step 1104→Yes).

In one embodiment, the flow can repair only one memory cell having a read current below the passing criteria that stands in the way for the whole integrated circuit to achieve a higher frequency. In an alternative embodiment, the flow can repair a few memory cells having read currents below the passing criteria that stand in the way for the whole integrated circuit to achieve a higher frequency. In yet other embodiments, the flow can repair all memory cells having read currents below the passing criteria in an integrated circuit.

Figure 12:
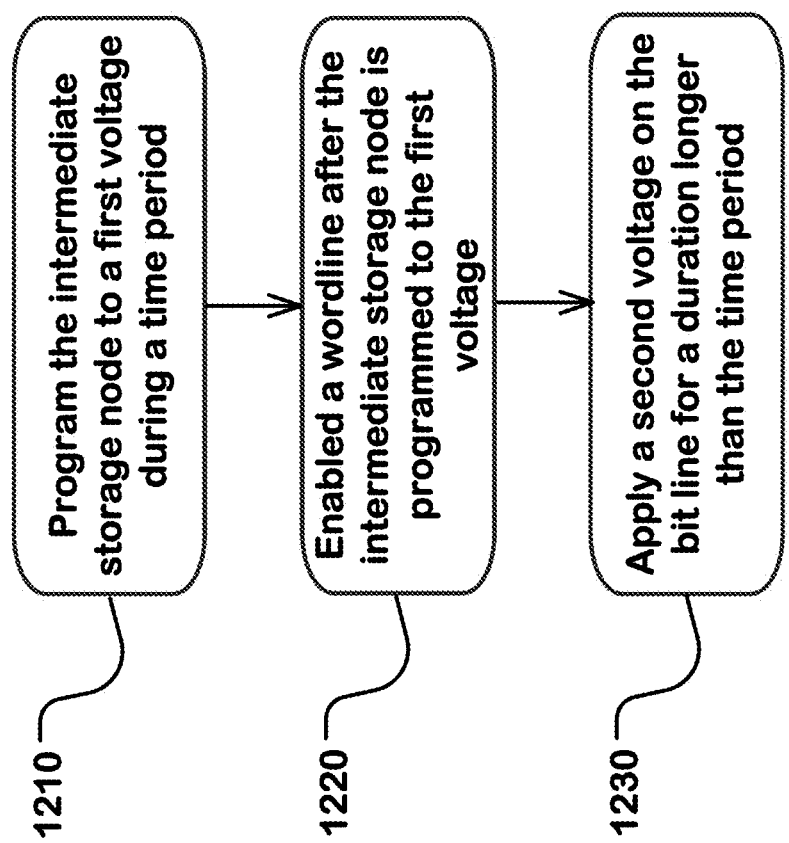
FIG. 12 is an example flow chart for applying a stress on a memory cell to repair a nanowire channel of a transistor in the memory cell.

FIG. 12 is an example flow chart for applying a stress on a memory cell to repair a nanowire channel of a transistor in the memory cell. FIG. 12 further illustrates Step 1105 in FIG. 11.

A current path as described herein (e.g., 1330, FIG. 13; 1430, FIG. 14) includes an intermediate storage node (e.g. $Q_L$, FIGS. 13 and 14) in the memory cell and a bit line (e.g. BL, FIGS. 13 and 14) connected to the memory cell. At Step 1210, the intermediate storage node can be programmed to a first voltage during a time period. At Step 1220, a word line (e.g. WL, FIGS. 13 and 14) connected to the memory cell can be enabled, after the intermediate storage node is programmed to the first voltage. At Step 1230, a second voltage can be applied on the bit line for a duration longer than the time period, the second voltage inducing a repair current to flow through the current path for inducing self-heating the transistor on the current path.

In one instance, the transistor is a first N-type device, the memory cell includes a second N-type device with a nanowire channel, the intermediate storage node (e.g. $Q_L$, FIG. 13) is coupled to the first and second N-type devices (e.g. $PG_L$ and $PD_L$, FIG. 13), and the first voltage corresponds to a low data value. In one embodiment, the memory cell is powered with a supply voltage (e.g. VDD, FIG. 13), and the second voltage is higher than the supply voltage. A precharge device (e.g. 1340, FIG. 13) can be connected to the bit line (e.g. BL, FIG. 13) for precharging the bit line when sensing a read current of the memory cell connected to the bit line, and the second voltage (e.g. VDDL, FIG. 13) is lower than a sum of the supply voltage and a threshold voltage of the precharge device. In another embodiment, the memory cell is powered with a supply voltage, and the second voltage is substantially equal to the supply voltage. As used herein, the term "substantially" is intended to accommodate manufacturing tolerances.

In another instance, the transistor is a P-type device (e.g. $PU_L$, FIG. 14), the memory cell includes an N-type device with a nanowire channel (e.g. $PG_L$, FIG. 14), the intermediate storage node (e.g. $Q_L$, FIG. 14) is coupled to the P-type device and the N-type device, the first voltage corresponds to a high data value, and the second voltage is lower than the first voltage.

Figure 13:
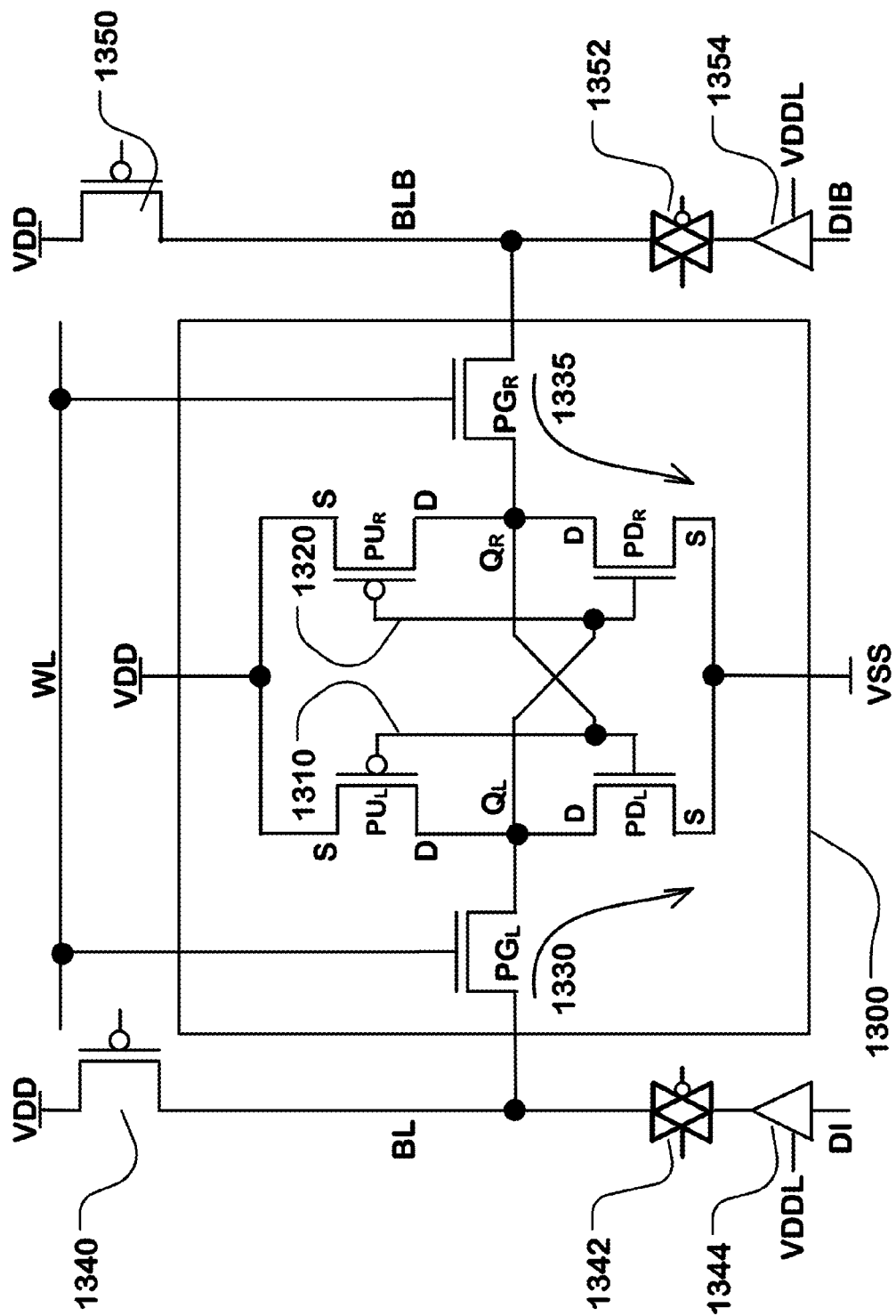
FIG. 13 illustrates an example transistor level schematic for a 6T-SRAM cell, reflecting a procedure to repair N-type nanowire devices in a 6T-SRAM cell.

FIG. 13 illustrates an example transistor level schematic for a 6T-SRAM (6 transistors—static random access memory) cell, reflecting a procedure to repair N-type nanowire devices in a 6T-SRAM cell weakened by aging such as NBTI or simply if strengthening the N-type devices is desired. An SRAM cell as referred to in the present specification is a memory cell that does not need to be periodically refreshed to retain stored data. An SRAM cell as referred to in the present specification is a memory cell utilizing sets of nanowires as the channel structure for transistors.

As illustrated in the example of FIG. 13, an SRAM cell 1300 uses a pair of cross-coupled inverters as a storage element to store a single bit of data. The pair includes a first inverter configured with an N-type pull-down transistor $PD_L$ and a P-type pull-up transistor $PU_L$, and a second inverter configured with a an N-type pull-down transistor $PD_R$ and a P-type pull-up transistor $PU_R$. The first inverter has a first intermediate storage node $Q_L$ acting as an output of the first inverter. The output of the first inverter is connected to a gate conductor of the second inverter (e.g. 1320), at which an input signal to the second inverter is applied. The second inverter has a second intermediate storage node $Q_R$ acting as an output of the second inverter. The output of the second inverter is connected to a gate conductor of the first inverter (e.g. 1310), at which an input signal to the first inverter is applied. The SRAM cell includes N-type pass gates $PG_L$ and $PG_R$ as access devices to provide a switchable data path for data into and out of the SRAM cell. A word line (WL) controls the SRAM cell for reading or writing. Complementary bit lines BL and BLB provide the data path to the pass gates $PG_L$ and $PG_R$.

Sources S of the pull-up transistors $PU_L$ and $PU_R$ are connected to the SRAM cell supply voltage (e.g. VDD), while sources of the pull-down transistors $PD_L$ and $PD_R$ are connected to the SRAM cell ground voltage (e.g. GND). Drains of the pull-up transistor $PU_L$ and pull-down transistor $PD_L$ are connected together at the first intermediate storage node $Q_L$ of the first inverter. The pass gate $PG_L$ is connected between the first intermediate storage node $Q_L$ of the first inverter and the bit line BL. A gate terminal of the pass gate $PG_L$ is connected to the word line WL. Drains of the pull-up transistor $PU_R$ and pull-down transistor $PD_R$ are connected together at the second intermediate storage node $Q_R$ of the second inverter. The pass gate $PG_R$ is connected between the second intermediate storage node $Q_R$ of the second inverter and the bit line BLB. A gate terminal of the pass gate $PG_R$ is connected to the word line WL.

A precharge device (e.g. 1340) controls applying the supply voltage (e.g. VDD) on the bit line BL for read operations. A buffer or level shifter (e.g. 1344) connects a data input signal (e.g. DI) through a multiplexer (e.g. 1342) to the bit line BL. The buffer has an independent power supply (e.g. VDDL) which can be controlled to provide a second voltage for repairing the N-type devices connected to the bit line BL. The second voltage can be higher than the supply voltage VDD, and lower than a sum of the supply voltage (e.g. VDD) and a threshold voltage of the precharge device 1340.

Similarly, a precharge device (e.g. 1350) controls applying the supply voltage (e.g. VDD) on a complementary bit line BLB for read operations. A buffer or level shifter (e.g. 1354) connects a data input signal (e.g. DIB) through a multiplexer (e.g. 1352) to the bit line BLB. The buffer has an independent power supply (e.g. VDDL) which can be controlled to provide a second voltage for repairing the N-type devices connected to the bit line BLB. The second voltage can be higher than the supply voltage VDD, and lower than a sum of the supply voltage (e.g. VDD) and a threshold voltage of the precharge device 1350.

For the simplified description below about the read and write operations of an SRAM cell, it is assumed that a high data value "1" stored in the SRAM cell corresponds to a state when the first intermediate storage $Q_L$ of the first inverter is at a high data value "1" and the second intermediate storage node $Q_R$ of the second inverter is at a low data value "0". At the beginning of a read or write operation, the word line WL selects the SRAM cell by turning on the pass gates $PG_L$ and $PG_R$. At the end of the read or write operation, the word line WL deselects the SRAM cell by turning off the pass gates $PG_L$ and $PG_R$.

In a write operation, a voltage corresponding to a low data value "0" is applied to one of BL and BLB, while a voltage corresponding to a high data value "1" is applied to another of BL and BLB, to change the state of the storage element. For instance, to write a high data value, a voltage corresponding to a high data value is applied to the bit line BL, while a voltage corresponding to a low data value is applied to the bit line BLB. To write a low data value, a voltage corresponding to a low data value is applied to the bit line BL, while a voltage corresponding to a high data value is applied to the bit line BLB.

When a high data value is stored in the SRAM cell, in the first inverter, the pull-down transistor $PD_L$ is turned off and the pull-up transistor $PU_L$ is turned on so that the first intermediate storage node $Q_L$ exhibits a high data value while, in the second inverter, the pull-down transistor $PD_R$ is turned on and the pull-up transistor $PU_R$ is turned off so that the second intermediate storage node $Q_R$ exhibits a low data value. When a low data value is stored in the SRAM cell, in the first inverter, the pull-down transistor $PD_L$ is turned on and the pull-up transistor $PU_L$ is turned off so that the first intermediate storage node $Q_L$ exhibits a low data value while, in the second inverter, the pull-down transistor $PD_R$ is turned off and the pull-up transistor $PU_R$ is turned on so that the second intermediate storage node $Q_R$ exhibits a high data value.

In a read operation, the bit lines BL and BLB are precharged to a voltage level corresponding to a high data value "1" (e.g. VDD), and the SRAM cell is selected by the word line WL. If a high data value "1" is stored in the SRAM cell, current flows through the pass gate $PG_R$ and the pull-down transistor $PD_R$ to ground, and through the pull-up transistor $PU_L$ and the pass gate $PG_L$ to the bit line BL. If a low data value "0" is stored in the SRAM cell, current flows through the pull-up transistor $PU_R$ and the pass gate $PG_R$ to the bit line BLB, and through the pass gate $PG_L$ and the pull-down transistor $PD_L$ to ground.

As shown in the example of FIG. 13, the two N-type devices (e.g. pass gate $PG_L$ and pull-down transistor $PD_L$) on the current path 1330 can be repaired by programming the first intermediate node $Q_L$ to a first voltage during a time period, then enabling the word line WL connected to the memory cell, and stressing the bit line BL to a second voltage for a duration longer than the time period. The second voltage can induce a current to flow through the current path 1330 for self-heating the two N-type devices (e.g. $PG_L$ and $PD_L$). The second voltage can be higher than the supply voltage VDD, and lower than a sum of the supply voltage (e.g. VDD) and a threshold voltage of the precharge device 1340. A voltage difference between the first voltage and the second voltage can ensure that a stress current flowing through the current path 1330 is strong enough to induce self-heating for repairing the N-type devices (e.g. $PG_L$ and $PD_L$).

Similarly, the two N-type devices (e.g. pass gate $PG_R$ and pull-down transistor $PD_R$) on the current path 1335 can be repaired by programming the second intermediate node $Q_R$ to a first voltage during a time period, then enabling the word line WL connected to the memory cell, and stressing the bit line BL to a second voltage for a duration longer than the time period. The second voltage can induce a current to flow through the current path 1335 for inducing self-heating the two N-type devices (e.g. $PG_R$ and $PD_R$). The second voltage can be higher than the supply voltage VDD, and lower than a sum of the supply voltage (e.g. VDD) and a threshold voltage of the precharge device 1350. A voltage difference between the first voltage and the second voltage can ensure that a stress current flowing through the current path 1335 is strong enough to induce self-heating for repairing the N-type devices (e.g. $PG_R$ and $PD_R$).

A procedure to characterize the read current of every memory cell of an SRAM array may be used first to determine the I-Read distribution and determine the memory cells including devices having nanowire channels that need repairing.

Figure 14:
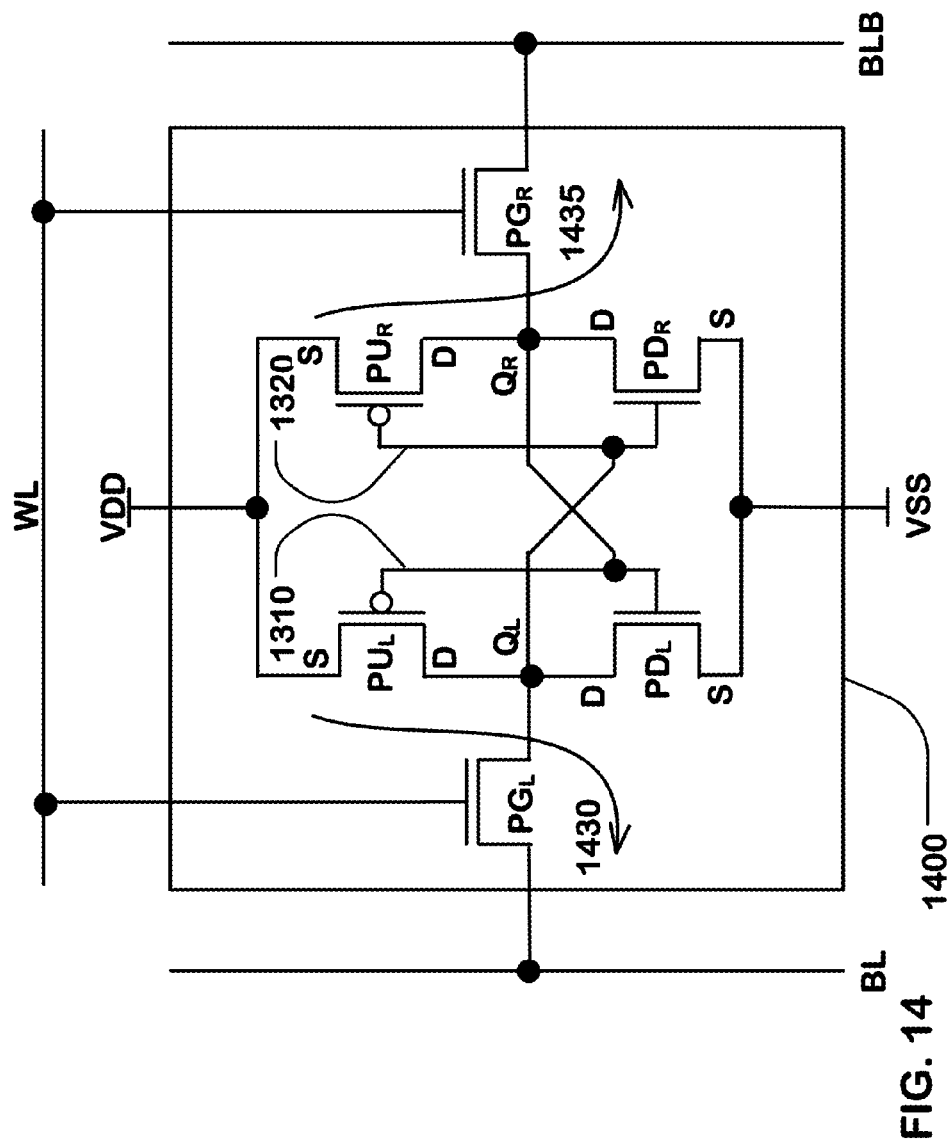
FIG. 14 illustrates an example transistor level schematic for a 6T-SRAM cell, reflecting a procedure to repair P-type nanowire devices in a 6T-SRAM cell.

FIG. 14 illustrates an example transistor level schematic for a 6T-SRAM cell, reflecting a procedure to repair P-type nanowire devices in a 6T-SRAM cell weakened by aging such as NBTI or simply if strengthening the P devices is desired. Description of the structure of a 6T-SRAM in connection to FIG. 13 is applicable to FIG. 14, and is not repeated for FIG. 14.

As shown in the example of FIG. 14, a P-type device (e.g. pull-up transistor $PU_L$) on the current path 1430 can be repaired by writing a high data value "1" at the first intermediate node $Q_L$, then a word line WL is enabled, a supply voltage VDD elevated to the desired stress voltage while the bit line BL is set at the desired voltage that induces the current to flow through the P-device connected between VDD and the first intermediate storage node $Q_L$. For instance, the bit line BL can be set to a voltage lower than the voltage at the first intermediate node $Q_L$ to ensure that a stress current flowing through the current path 1430 is strong enough to induce self-heating for repairing the P-type device $PU_L$.

Similarly, a P-type device (e.g. pull-up transistor $PU_R$) on the current path 1435 can be repaired by writing a high data value "1" at the second intermediate node $Q_R$, then a word line WL is enabled, a supply voltage VDD elevated to the desired stress voltage while the complementary bit line BLB is set at the desired voltage that induces the current to flow through the P-device connected between VDD and the second intermediate storage node $Q_R$. For instance, the complementary bit line BLB can be set to a voltage lower than the voltage at the second intermediate node $Q_R$ to ensure that a stress current flowing through the current path 1435 is strong enough to induce self-heating for repairing the P-type device $PU_R$.

In an embodiment, the performance of each cell being repaired is re-measured (sensed) again after an increment of repair heating time, and the repair is repeated if still needed. The process can be repeated until the target performance is achieved.

FIGS. 15A, 15B and 15C are simplified block diagrams of a computer system suitable for use with embodiments of the present technology, as well as repair circuit embodiments of the technology. Computer system 1510 typically includes at least one processor 1514 which communicates with a number of peripheral devices via bus subsystem 1512. These peripheral devices may include a storage subsystem 1524 including EDA software as described in connection with FIG. 10, with a nanowire cell library, to determine critical paths and add repair circuits in the critical paths as described herein. The storage subsystem can comprise a memory subsystem 1526 and a file storage subsystem 1528, user interface input devices 1522, user interface output devices 1520, and a network interface subsystem 1516. The input and output devices allow user interaction with computer system 1510. Network interface subsystem 1516 provides an interface to outside networks, including an interface to communication network 1518, and is coupled via communication network 1518 to corresponding interface devices in other computer systems. Communication network 1518 may comprise many interconnected computer systems and communication links. These communication links may be wireline links, optical links, wireless links, or any other mechanisms for communication of information. While, in one embodiment, communication network 1518 is the Internet, communication network 1518 may be any suitable computer network.

User interface input devices 1522 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 1510 or onto communication network 1518.

User interface output devices 1520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1510 to the user or to another machine or computer system.

Storage subsystem 1524 stores the basic programming and data constructs that provide the functionality of some or all of the EDA tools described herein, and tools applied for development of cells for the library and for physical and logical design using the library. These modules are generally executed by processor 1514. The tools include logic to identify a particular device having a particular transistor with a nanowire channel, and add to the integrated circuit design a controller which, when activated, repairs the particular transistor by self-heating. The tools also include the logic to analyze an integrated circuit design in inserting repair circuits as describe above.

Memory subsystem 1526 typically includes a number of memories including a main random access memory (RAM) 1530 for storage of instructions and data during program execution and a read only memory (ROM) 1532 in which fixed instructions are stored. File storage subsystem 1528 provides persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystem 1528.

Bus subsystem 1512 provides a mechanism for letting the various components and subsystems of computer system 1510 communicate with each other as intended. Although bus subsystem 1512 is shown schematically as a single bus, alternative embodiments of the bus subsystem may use multiple busses.

Computer system 1510 itself can be of varying types including a personal computer, a portable computer, a workstation, a computer terminal, a network computer, a television, a mainframe, or any other data processing system or user device. Due to the ever-changing nature of computers and networks, the description of computer system 1510 depicted in FIG. 15A is intended only as a specific example for purposes of illustrating the preferred embodiments. Many other configurations of computer system 1510 are possible having more or less components than the computer system depicted in FIG. 15A.

FIG. 15B shows a memory 1540 such as a non-transitory, computer readable data storage medium associated with file storage subsystem 1528, and/or with network interface subsystem 1516, and can include a data structure specifying a circuit design that includes cells from the nanowire cell library, or other nanowire cell-based cells. In other embodiments, the memory 1540 stores a cell library that includes cells implemented using a flexible nanowire cell structure. The memory 1540 can be a hard disk, a floppy disk, a CD-ROM, an optical medium, removable media cartridge, or other medium that stores computer readable data in a volatile or non-volatile form. The memory 1540 is shown storing a circuit design 1580, including for example a description of geometric features of logic circuitry implementing a path including a particular device having a transistor with a nanowire channel; and a repair circuit connected to the particular device in the path, the repair circuit including a selection block selecting among a plurality of signals as an input signal to the particular device, created with the technology described herein. The plurality of signals can include a repair signal and an operational logic signal, the repair signal being such as to apply the self-heating stress to the nanowire channel of the particular device when activated. The circuit design 1580 can include for example memory cells having transistors with nanowire channels. The circuit design 1580 can include a controller configured to repair a particular transistor with a nanowire channel by self-heating as described herein. For example, the particular transistor with a nanowire channel can be in a particular device in a path in the logic circuitry, or in a memory cell. The technology described herein improves the EDA process, enabling more effective utilization of nanowire devices and other devices having wide variability in operating parameters. Also, the design tools using this technology are also improved and can operate more effectively, so that final designs using nanowire devices can be reached with less processing resources.

FIG. 15C is a block representing an integrated circuit 1590 created with the described technology that includes nanowire cells, and a controller configured to repair a particular transistor with a nanowire channel by self-heating. The integrated circuit can include a path in the logic circuitry, the path including a particular device having a transistor with a nanowire channel; and a repair circuit connected to the particular device in the path, the repair circuit including a selection block selecting among a plurality of signals as an input signal to the particular device. The plurality of signals can include a repair signal and an operational logic signal, the repair signal being such as to apply the self-heating stress to the nanowire channel of the particular device when activated. The controller can be configured to perform a repair process on a nanowire channel of a transistor in a particular device in the path, using the repair circuit as described herein. The integrated circuit can include memory cells having transistors with nanowire channels, and the controller can be configured to perform a repair process on a nanowire channel of a transistor in a memory cell as described herein.

Figure 16:
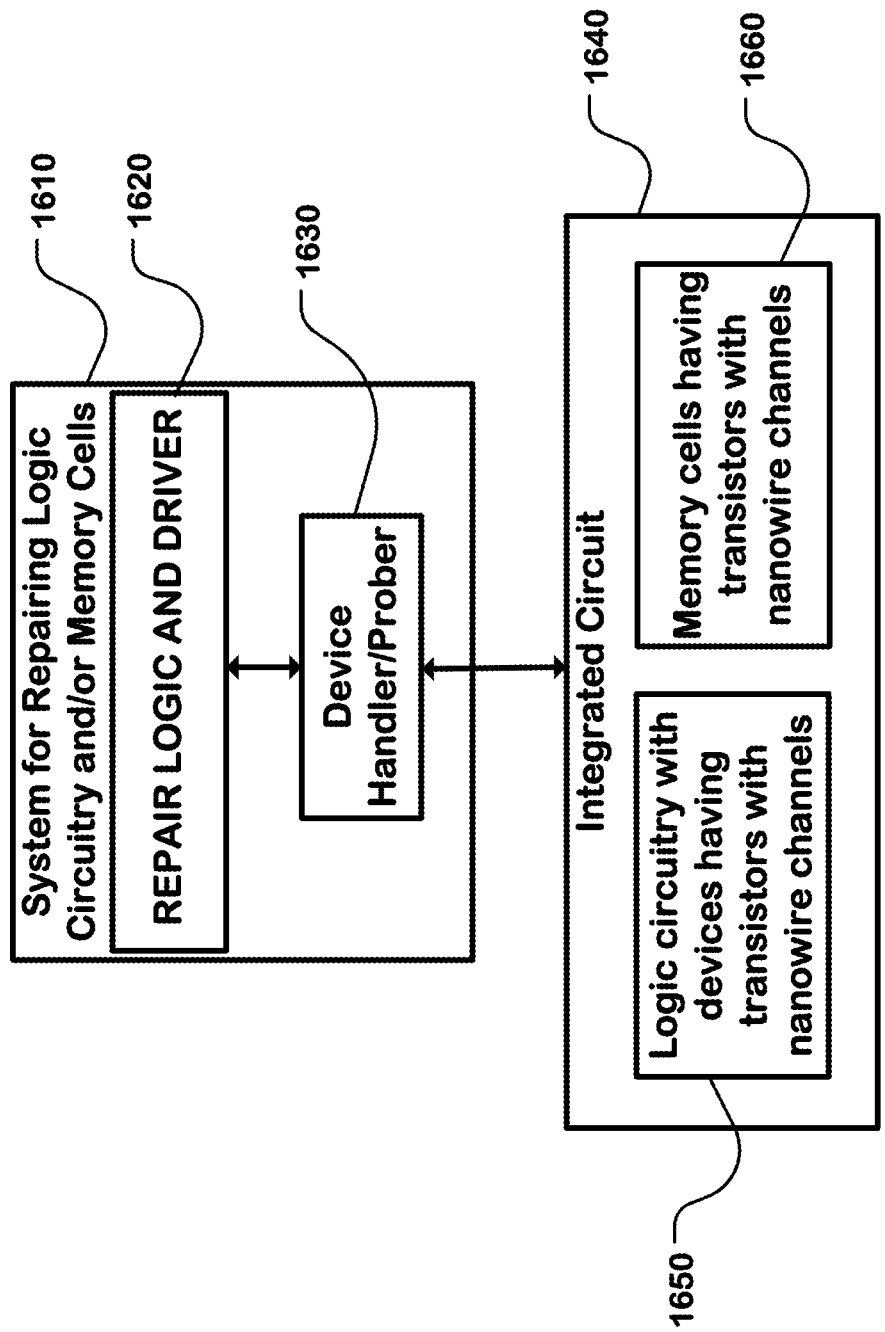
FIG. 16 illustrates an example of an apparatus comprising logic to repair memory cells having transistors with nanowire channels on an integrated circuit.

FIG. 16 illustrates an example of an apparatus comprising logic to repair logic circuitry with devices having transistors with nanowire channels and/or memory cells having transistors with nanowire channels on an integrated circuit. The logic can include calculating a timing slack of a repairable path in the logic circuitry; and if the calculated timing slack is negative, then applying a stress on a particular device having a transistor with a nanowire channel in the repairable path to change the timing slack of the repairable path. In this example, the apparatus comprise a processor system 1610 used for executing or causing execution of a process to repair the logic circuitry and/or memory cells as discussed herein, on an integrated circuit 1640. The integrated circuit 1640 is connected to the system 1610 during manufacturing before packaging, such as in wafer form in some embodiments. In other embodiments, the system 1610 can be connected to the integrated circuit in a packaged form.

The logic can include determining a memory cell that has a read current below a passing criteria, where the memory cell has a transistor with a nanowire channel on a current path through which the read current flows; and applying a stress on the memory cell to repair the nanowire channel of the transistor in the memory cell on the current path. In this example, the apparatus comprise a processor system 1610 used for executing or causing execution of a process to repair the memory cell as discussed herein, on an integrated circuit 1640. The integrated circuit 1640 is connected to the system 1610 during manufacturing before packaging, such as in wafer form in some embodiments. In other embodiments, the system 1610 is connected to the integrated circuit in a packaged form.

An example system used for executing a process to repair memory cells on an integrated circuit can include programmed process executed in a manufacturing line using equipment used for testing, or using equipment like that used for testing, which include circuitry for accessing the integrated circuit such as wafer probe circuits, voltage sources, and the like. For example a manufacturing line may have multiple device testers, multiple device probers, multiple device handlers, and multiple interface test adapters configured to connect to the integrated circuits which can be configured to control execution of the procedures described herein. In an alternative, a system may be configured to interact with packaged integrated circuits, and may be deployed away from the manufacturing line for the integrated circuit, such as at an assembly installation for an original equipment manufacturer utilizing the integrated circuits.

As shown in FIG. 16, an example system 1610 includes REPAIR LOGIC and Driver 1620, and a device handler/prober 1630. An integrated circuit 1640 to be subjected to the REPAIR LOGIC and Driver 1620 is coupled to the device handler/prober 1630. The integrated circuit 1640 can include logic circuitry 1650 with devices having transistors with nanowire channels 1160 and/or memory cells having transistors with nanowire channels 1660. During manufacturing of an integrated circuit, the system 1610 can perform the actions identified herein to repair the logic circuitry and/or memory cells on the integrated circuit.

An example integrated circuit in the system 1610 may be an integrated circuit 1590, as described with reference to FIG. 15C. During manufacturing of the integrated circuit 1590, the system 1610 can perform the actions identified herein to repair the logic circuitry on the integrated circuit.

Using the present technology as described herein, devices having nanowire channels in a critical path can be repaired so the critical path will not prevent the logic circuitry from performing at the target clock frequency. Using the present technology as described herein, memory cells having transistors with nanowire channels can be repaired, so memory speed can be restored and the yield of an integrated circuit including memory cells having transistors with nanowire channels can be improved.

The term "nanowire" as used herein is a length of material, for example silicon, which has a minimum cross-sectional dimension of less than 10 nm, and which can be sheathed by insulating material. A nanowire has a "longitudinal" direction, which as used herein is the direction of current flow. The "minimum cross-sectional dimension" is the minimum dimension of the material taken in a plane perpendicular to the longitudinal direction. The "length" of a nanowire, as used herein, refers to its length in the longitudinal direction. Nanowires can be fabricated with their longitudinal direction oriented either vertical or horizontal. Some fabrication processes form horizontally-oriented nanowires which are wider in the cross-sectional plane than they are tall, in which case the nanowires are sometimes referred to as "nanosheets". For purposes of the discussion herein, the terms nanowire and nanosheet are used interchangeably.

Additionally, the term "nanowire" itself, as used herein, does not imply any particular doping profile. Thus, as used herein, a "nanowire" can contain a longitudinal segment or segments having a conductivity, and if appropriate for the particular material of the nanowire a dopant concentration, suitable for operation as a channel of a transistor, a source of a transistor, a drain of a transistor or as an interconnect. A "nanowire transistor", as used herein, refers to a nanowire having a nanowire channel whose conductivity is controlled by a gate stack surrounding it in the cross-sectional plane, bounded longitudinally by source/drain regions. A nanowire transistor is sometimes referred to as a "gate all-around field effect transistor" (GAAFET). Horizontally oriented nanowires can be stacked vertically in different layers, with gate stack material not only surrounding the entire structure including the horizontally oriented nanowires, but also between nanowire layers. Such nanowire layers, individually surrounded by gate stack material, are considered herein to constitute separate nanowire channels. The vertically-adjacent source/drain materials in such stacked structures are typically (but not necessarily) connected together electrically, or formed as a shared source/drain material for all layers of the stack. Whether or not vertically-adjacent source/drain regions are connected together, the transistors formed in each layer are considered herein to constitute separate nanowire transistors as the term is used herein.

We claim as follows:

1. An integrated circuit including memory cells having transistors with nanowire channels, comprising:
    a controller configured to perform a repair process on a nanowire channel of a transistor in a memory cell, the transistor on a current path through an intermediate storage node in the memory cell and a bit line connected to the memory cell, the repair process comprising:

programming the intermediate storage node to a first voltage during a time period;

enabling a word line connected to the memory cell, after the intermediate storage node is programmed to the first voltage; and applying a second voltage on the bit line for a duration longer than the time period, the second voltage inducing a repair current to flow through the current path for self-heating the transistor on the current path.

2. The integrated circuit of claim 1, wherein the transistor is a first N-type device, the memory cell includes a second N-type device with a nanowire channel, the intermediate storage node is coupled to the first and second N-type devices, and the first is lower than the second voltage.

3. The integrated circuit of claim 1, wherein the memory cell is powered with a supply voltage, and the second voltage is higher than the supply voltage.

4. The integrated circuit of claim 3, wherein a precharge device is connected to the bit line for precharging the bit line when sensing a read current of the memory cell connected to the bit line, and the second voltage is lower than a sum of the supply voltage and a threshold voltage of the precharge device.

5. The integrated circuit of claim 1, wherein the memory cell is powered with a supply voltage, and the second voltage is substantially equal to the supply voltage.

6. The integrated circuit of claim 1, wherein the transistor is a P-type device, the memory cell includes an N-type device with a nanowire channel, the intermediate storage node is coupled to the P-type device and the N-type device, and the second voltage is lower than the first voltage.

* * * * *